(12) United States Patent
Kobayashi

(10) Patent No.: US 8,112,716 B2
(45) Date of Patent: Feb. 7, 2012

(54) INFORMATION PROCESSING APPARATUS AND CONTROL METHOD THEREOF, AND COMPUTER PROGRAM

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 12/170,994

(22) Filed: Jul. 10, 2008

(65) Prior Publication Data
US 2009/0024956 A1 Jan. 22, 2009

(30) Foreign Application Priority Data
Jul. 17, 2007 (JP) ................. 2007-186326

(51) Int. Cl.
*G06F 3/048* (2006.01)
(52) U.S. Cl. ......... 715/784; 715/786; 715/788; 715/800
(58) Field of Classification Search .................. 715/784, 715/786, 788, 800
See application file for complete search history.

(56) References Cited

U.S. PATENT DOCUMENTS
| | | | |
|---|---|---|---|
| 5,815,151 A | 9/1998 | Argiolas | |
| 7,051,289 B1 | 5/2006 | Yoshida | |

FOREIGN PATENT DOCUMENTS
| | | |
|---|---|---|
| JP | 09-185480 | 7/1997 |
| JP | 2765615 | 6/1998 |
| JP | 3431795 | 7/2003 |
| JP | 3586351 | 11/2004 |

*Primary Examiner* — Adam M Queler
*Assistant Examiner* — Andrea Long
(74) *Attorney, Agent, or Firm* — Cowan, Liebowitz & Latman, P.C.

(57) ABSTRACT

An information processing apparatus comprising display unit configured to display a window, accepting unit configured to accept a resize instruction of the displayed window together with a scroll instruction indicating whether or not to scroll display contents within the window, and control unit configured to control a size of the window and a scrolling of the display contents within the window based on contents of the resize instruction and the scroll instruction, wherein when the scroll instruction indicates that the display contents are to be scrolled, the control unit changes the window to a size indicated by the resize instruction, and scrolls the display contents according to a change amount of the window, and when the scroll instruction indicates that the display contents are not to be scrolled, the control unit changes the window to a size indicated by the resize instruction, and suppresses a scrolling of the display contents.

15 Claims, 29 Drawing Sheets

INFORMATION PROCESSING APPARATUS AND CONTROL METHOD THEREOF, AND COMPUTER PROGRAM

BACKGROUND OF THE INVENTION

1. Field of the Invention

The present invention relates to an information processing apparatus and control method thereof, and a computer program.

2. Description of the Related Art

Conventionally, an information processing system, which can simultaneously execute a plurality of applications with user interfaces, can display a plurality of windows corresponding to the applications at the same time, and can control the respective windows to serve as independent user interfaces.

In such a case, the information processing system can display the plurality of windows by one of the following methods. A method of overlapping the windows at arbitrary locations according to the rule of a predetermined priority order upon displaying the respective windows is available (overlap method). Also, a method of tiling the windows without overlapping each other upon displaying the respective windows is available (tiling window method). In general, when many windows need to be displayed within a limited display screen, the overlap method is more effective.

Most of windows allow modification of their sizes and locations in the X and Y directions independently or simultaneously. When the overlap method is used, the windows need to be moved or resized to avoid completely covered windows as a result of window overlap.

When a plurality of applications run in parallel, and corresponding windows are displayed at the same time, a display controller of an information processing apparatus displays a window to be prioritized or a window selected by the user for access in front of all other windows in each case. The whole area of the window displayed in front of all other windows is displayed, and partial areas of other windows are displayed based on their overlapping states.

However, in this situation, when the user wants to frequently access a window hidden by other windows or to refer to its contents, the user needs to make a predetermined operation for windows. This operation includes that of switching display to locate a desired window in front of all other windows and that of downsizing or moving the windows located in front of the target window.

In general, upon resizing a window (e.g., to reduce its size), it becomes difficult to display all the contents displayed before resizing within the resized window. For this reason, only partial contents to be prioritized are displayed. The sequence for determining such part to be prioritized is executed either automatically or manually.

A window is resized by dragging one border or corner of the window. The window is moved by dragging a specific region which is not used for resizing.

Upon resizing a window, there is a specification prepared in advance for each window type, and display control upon resizing is performed based on the specification. More specifically, a specification that moves the display contents upon dragging when a window is resized by dragging one border or corner is available. Also, a specification that does not move the display contents irrespective of dragging is available. Furthermore, a specification that moves the display contents to have a predetermined ratio with respect to dragging or reduces or modifies them is available.

These specifications are determined in advance for respective window types or for respective places to be dragged even on one window. Note that in the present specification, moving the display contents of a window upon resizing the window will be referred to as "scrolling".

A general display control method upon resizing a window will be described below.

FIG. 21 shows the configuration of a window to be displayed on a display device. FIG. 21 shows a window that displays a document. FIGS. 22A to 22D and FIGS. 23A to 23D are explanatory views of popular display control methods upon resizing a window.

FIGS. 22A to 22D are views showing cases in which the window shown in FIG. 21 is resized by dragging one of the four borders.

In general, upon resizing the window by moving the right or bottom border of the four borders, the display contents near the border opposite to the border to be moved remain unchanged, and those near the border to be moved are changed. FIGS. 22A and 22C show the cases in which the window size is reduced by moving the right or bottom border. In these cases, the display contents near the border to be moved are gradually hidden.

Upon resizing the window by moving the left or top border of the four borders, the display contents near the border to be moved remain unchanged, and those near the border opposite to the border to be moved are changed. FIGS. 22B and 22D show the cases in which the window size is reduced by moving the left or top border. In these cases, the display contents near the right or bottom border opposite to the border to be moved are gradually hidden.

FIGS. 23A to 23D show cases in which the window shown in FIG. 21 is resized by dragging the corners of the window. Note that the corners of the window mean the intersections of the respective borders that define the window.

As shown in FIGS. 23A to 23D, when the window is resized by dragging the upper left, upper right, lower left, and lower right corners of the window, the display contents near the upper left corner remain unchanged, and those near other corners are gradually hidden.

The concept of the display control shown in FIGS. 22A to 22D and FIGS. 23A to 23D is to basically preferentially display the left and up directions of the display contents of a window. On the other hand, many windows which aim at the drawing function and display of general figures do not always preferentially display the left and up directions, and different specifications are determined in advance for respective window types.

Many specifications associated with resizing of a window are designed to naturally locate the contents to be prioritized at a display position if the user normally makes a resizing operation. However, a part that the user wants to display does not always move to the display position, and an operation for individually shifting the position of the display contents after resizing is often required.

Most windows have scroll bars to shift the position of the display contents. In general, the user can move the contents that the user wants to display or access to the position within the window by operating the scroll bar.

The inventions that improve the operations for resizing a window by dragging, for example, a predetermined part of the window are disclosed in Japanese Patent Nos. 2765615 and 3431795.

On the other hand, a certain window often configures parent and child windows defined by predetermined specifications so as to prevent related windows from being uneasy to see due to overlap display or to prevent correspondence between the related windows from confusing.

The inventions that relate to a method of controlling the relationship between the parent and child windows upon resizing a window are disclosed in Japanese Patent Laid-Open No. 9-185480 and Japanese Patent No. 3586351.

In order to resize (especially, reduce) a window and to preferentially display a desired part, use of the display control specification determined in advance for each window type does not suffice. In many cases, the user needs to perform two operations step by step in such a manner that the user is required to scroll the display contents by a predetermined amount in a predetermined direction after resizing. Such requirement results in inefficiency upon making various operations on a computer, thus decreasing productivity accordingly.

SUMMARY OF THE INVENTION

Embodiments of the present invention provides a technique that allows the user to arbitrarily and intuitively perform an operation for moving a desired part to be prioritized to a predetermined location concurrently with resizing during resizing a window.

According to an exemplary embodiment of the present invention, there is provided an information processing apparatus comprising, display unit configured to display a window, accepting unit configured to accept a resize instruction of the displayed window together with a scroll instruction indicating whether or not to scroll display contents within the window, and control unit configured to control a size of the window and a scrolling of the display contents within the window based on contents of the resize instruction and the scroll instruction, wherein when the scroll instruction indicates that the display contents are to be scrolled, the control unit changes the window to a size indicated by the resize instruction, and scrolls the display contents according to a change amount of the window, and when the scroll instruction indicates that the display contents are not to be scrolled, the control unit changes the window to a size indicated by the resize instruction, and suppresses a scrolling of the display contents.

According to another exemplary embodiment of the present invention, there is provided a method of controlling an information processing apparatus comprising, displaying a window on a display unit, accepting a resize instruction of the displayed window together with a scroll instruction indicating whether or not to scroll display contents within the window, and controlling a size of the window and a scrolling of the display contents within the window based on contents of the resize instruction and the scroll instruction, wherein when the scroll instruction indicates that the display contents are to be scrolled, the window is changed to a size indicated by the resize instruction, and the display contents are scrolled according to a change amount of the window, and when the scroll instruction indicates that the display contents are not to be scrolled, the window is changed to a size indicated by the resize instruction, and scrolling of the display contents is suppressed.

Further features of the present invention will become apparent from the following description of exemplary embodiments with reference to the attached drawings.

DESCRIPTION OF THE EMBODIMENTS

Embodiments of the invention will be described hereinafter with reference to the accompanying drawings.

The present invention provides a technique which arbitrarily controls, concurrently with dragging, whether or not to scroll the display contents of a window in response to dragging upon resizing the window by dragging an element (border, corner, boundary, etc.) which configures the window. In particular, the present invention proposes the following three control techniques.

The first control technique covers a case in which the user resizes a window by mainly dragging one border of the window. This technique is characterized in that a direction component, which is not directly related to resizing, of those of the cursor motion upon movement is used in control. In corresponding embodiments, two different regions are formed on each border of a window, and ON/OFF of scrolling can be controlled concurrently with dragging by selecting that region while dragging.

The second control technique is characterized in that ON/OFF of scrolling is controlled by operating a button other than that for dragging of an operation unit upon making a drag movement. This technique can be applied to both a case of dragging a corner and that of dragging a border.

The third control technique executes control by cooperating the first and second control techniques. With this technique, on a window including a plurality of sub-windows, each sub-window is resized by dragging a boundary of the sub-window. In case of the window including the plurality of sub-windows, since each boundary is independently controlled, this technique can also be applied to a window including many sub-windows.

First Embodiment

The first embodiment of the invention will be described hereinafter. This embodiment will explain an embodiment that relates to the first control technique.

Figure 1A:
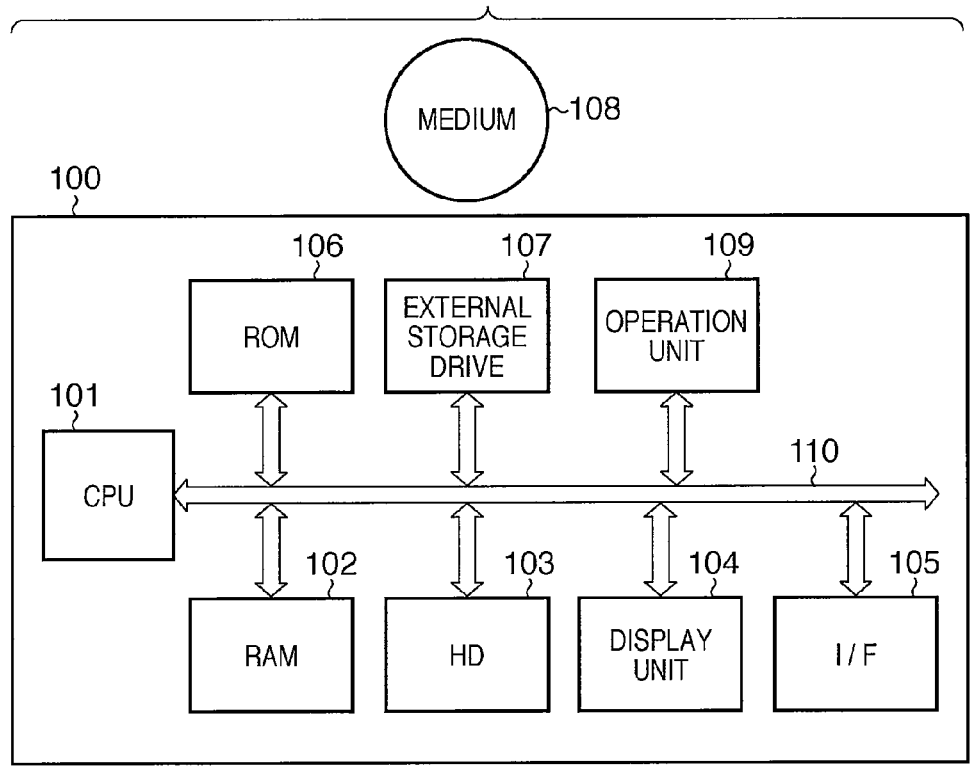
FIG. 1A is a block diagram showing an example of the hardware arrangement of an information processing apparatus according an embodiment of the invention.

FIG. 1A is a block diagram showing an example of the hardware arrangement of an information processing apparatus used to implement the present invention. Referring to FIG. 1A, a CPU 101 executes an OS, application programs, and the like stored in an HD (hard disk) 103, and controls to temporarily store information, files, and the like required for execution of the programs in a RAM 102. The RAM 102 serves as a main memory, work area, and the like of the CPU 101. The HD 103 stores the application programs, driver programs, the OS, control programs, a processing program required to execute processing according to this embodiment, and the like.

A display unit 104 displays information according to commands input from an operation unit 109, externally acquired information, and the like. The display unit 104 may adopt any display method of CRT type, liquid crystal type, PDP type, SED type, and organic EL type. The display unit 104 displays a window according to this embodiment. A network interface (to be referred to as "I/F" hereinafter) 105 is a communication interface used to connect a network. A ROM 106 stores programs such as a basic I/O program and the like.

An external storage drive 107 can load programs and the like stored in a medium 108 to this computer system. The medium 108 as a storage medium stores predetermined programs and related data. The operation unit 109 is a user interface used to accept operations and instructions from an operator of this apparatus, and comprises a keyboard, mouse, digital pen, and the like. A system bus 110 controls the flow of data in the apparatus.

Figure 1B:
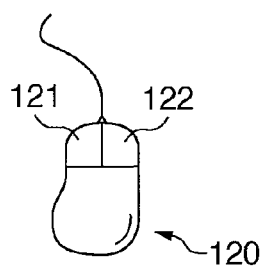
FIG. 1B shows an example of the arrangement of a mouse as an example of an operation unit 109 according the embodiment of the invention.
Figure 1C:
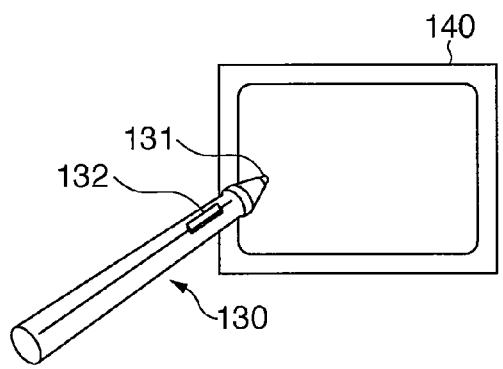
FIG. 1C shows an example of the arrangement of a digital pen and tablet as an example of the operation unit 109 according the embodiment of the invention.

Note that a mouse, digital pen, and tablet as examples of the operation unit 109 can have the arrangements shown in, for example, FIGS. 1B and 1C. In this case, the mouse and tablet are connected to an information processing apparatus 100 using USB connections, and can serve as the operation unit 109.

A mouse 120 shown in FIG. 1B can constitute a part of the operation unit 109. The mouse 120 has the left button 121 and the right button 122. Although not shown, the bottom surface of the mouse 120 comprises a structure for detecting a moving amount and direction of the mouse 120 using a mechanical mechanism using a ball or an optical mechanism using an optical sensor.

A digital pen 130 and tablet 140 shown in FIG. 1C can constitute a part of the operation unit 109. The digital pen 130 can comprise a tip switch 131 at the pen tip, and a side switch 132 on the side surface. The tip switch 131 corresponds to the left button 121 of the mouse 120, and the side switch 132 corresponds to the right button 122 of the mouse 120. The tip switch 131 can be turned on by pressing it against the tablet 140. The side switch 132 can be turned on when the operator holds it down with the finger.

The tablet 140 comprises a pressure-sensitive or electrostatic contact sensor, and can detect the position of the digital pen 130 when the tip of the digital pen 130 is pressed against the tablet 140. When the operator moves the digital pen 130 while pressing the tip against the tablet 140, the tablet 140 can detect the moving direction and amount of the digital pen 130. Note that the tablet 140 may be integrated with the display unit 104.

Figure 2:
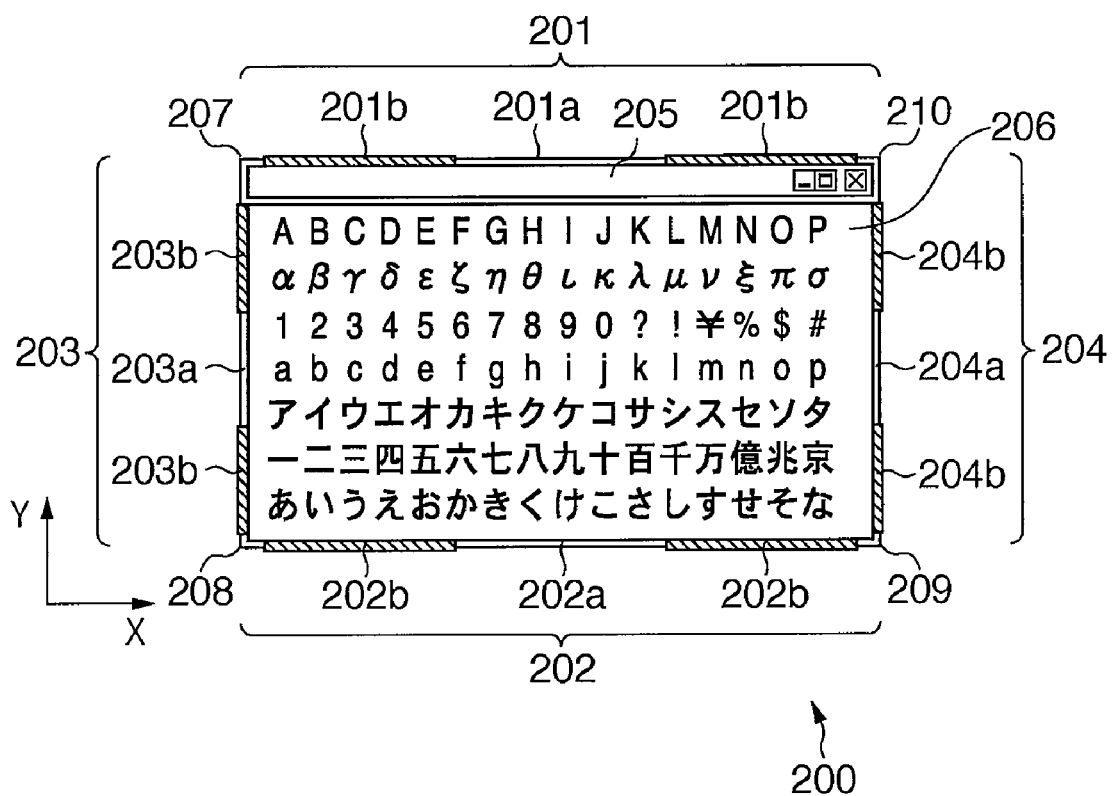
FIG. 2 shows an example of the configuration of a window according the embodiment of the invention.
Figure 3A:
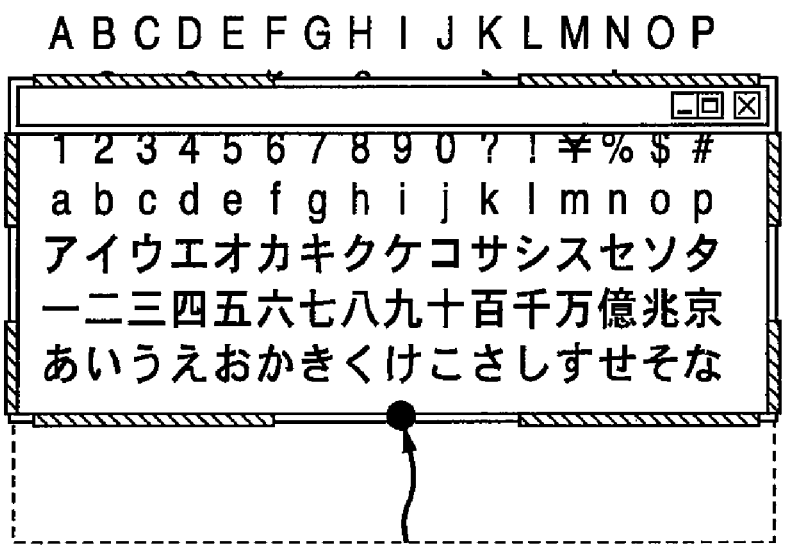
FIGS. 3A to 3D show display examples when the user locates a cursor on a first or second region of a top border 201 or bottom border 202 of a window and drags it according to the first embodiment of the invention.
Figure 3B:
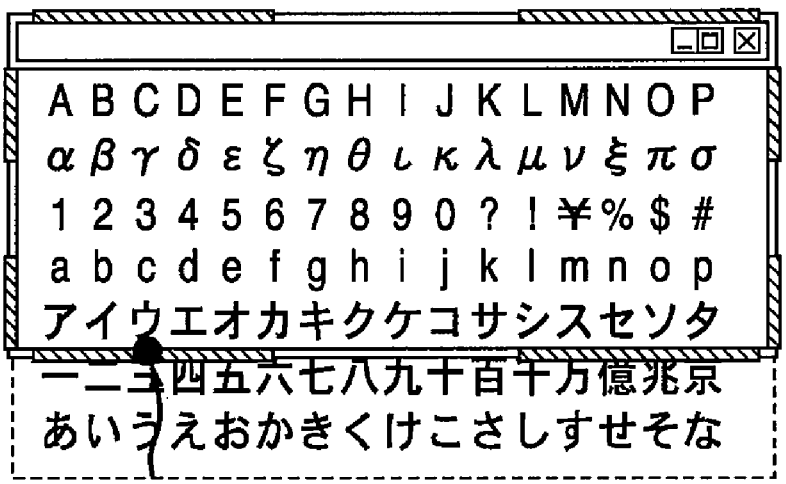
Figure 3C:
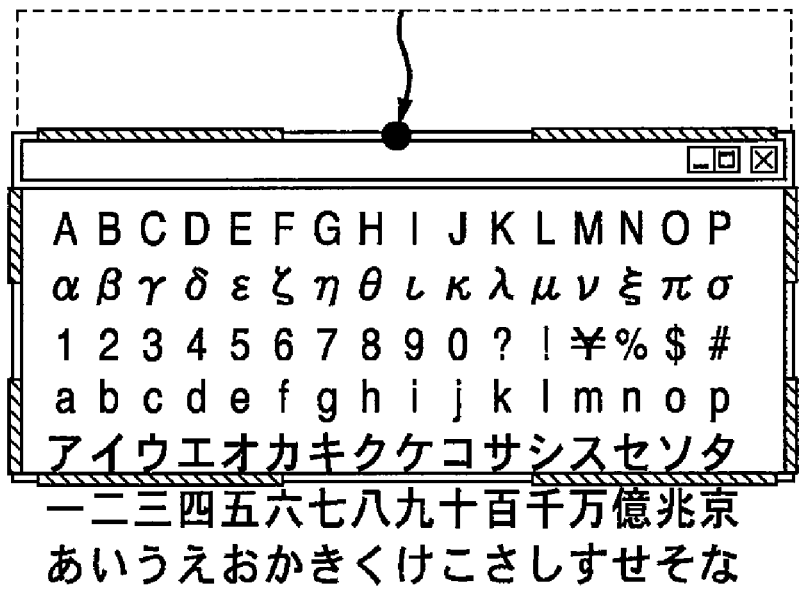
Figure 3D:
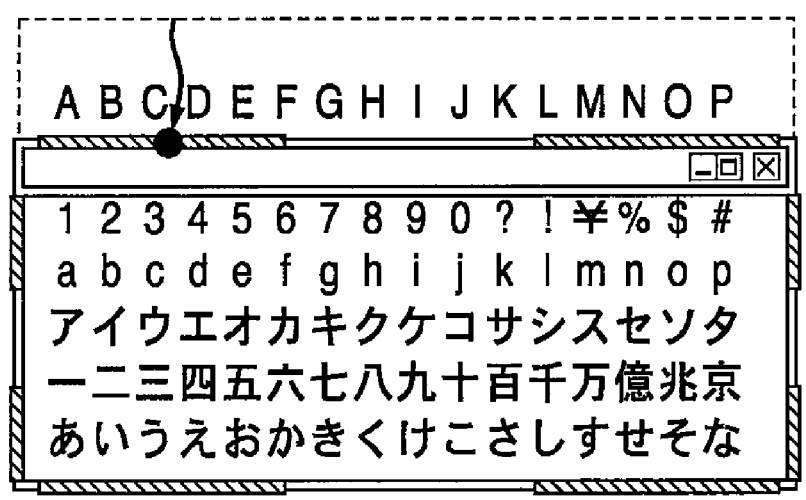
Figure 4A:
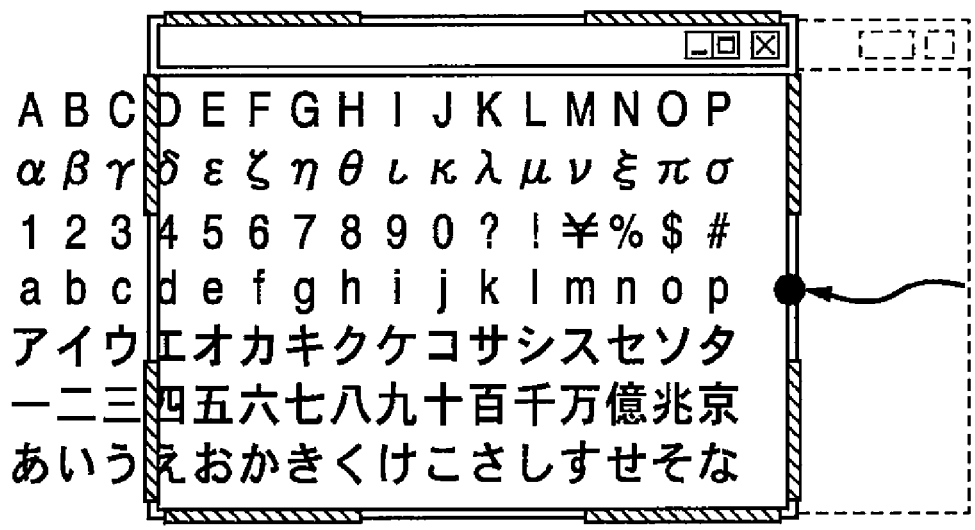
FIGS. 4A to 4D show display examples when the user locates the cursor on a first or second region of a left border 203 or right border 204 of a window and drags it according to the first embodiment of the invention.
Figure 4B:
Figure 4C:
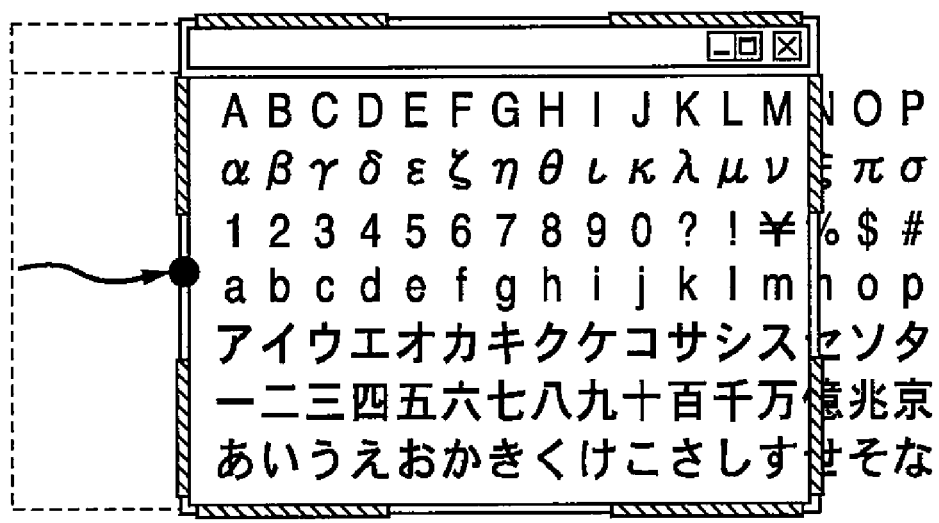
Figure 4D:
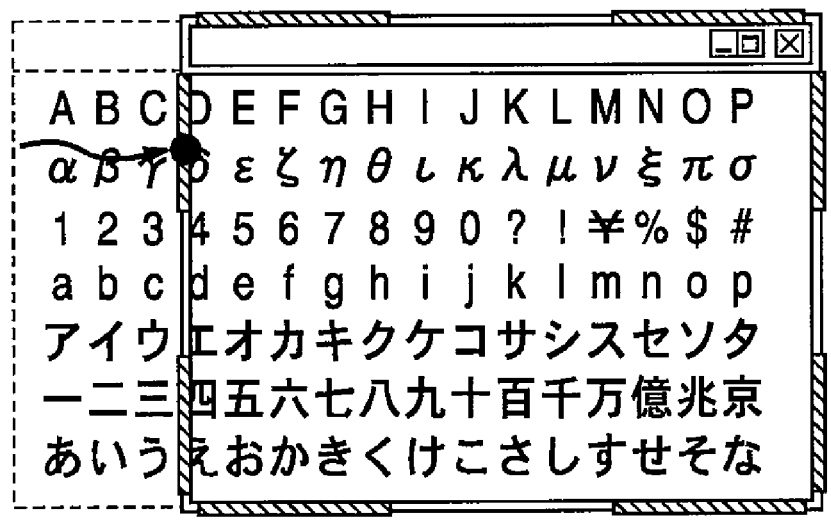

An example of the configuration of a window according to the embodiment of the invention will be described below with reference to FIG. 2. FIG. 2 shows an example of the configuration of a window according to the embodiment of the invention.

Referring to FIG. 2, a window 200 has a rectangular shape, and is defined by four borders, that is, a top border 201, bottom border 202, left border 203, and right border 204. The window 200 has four corners 207, 208, 209, and 210. The corner 207 is defined as an intersection between the top border 201 and left border 203, the corner 208 is defined as an intersection between the left border 203 and bottom border 202, the corner 209 is defined as an intersection between the bottom border 202 and right border 204, and the corner 210 is defined as an intersection between the right border 204 and top border 201.

In this embodiment, each border is divided into two different regions, that is, first and second region. More specifically, the first region is located to include the center of the border, and the second region is located to include the end portions of the border, and to sandwich the first region. For example, on the top border 201, a first region 201a including the center of the border is located to be sandwiched between second regions 201b including the end portions of the border.

As the division method of the first and second region, each border may be equally divided into three or the first region may be slightly longer or shorter than the length obtained when the border is equally divided into three regions. This embodiment will exemplify a case in which one border is equally divided into three regions.

The window 200 includes a title bar 205 and display area 206. The title bar 205 displays information corresponding to the content displayed in the display area 206. For example, when the display area 206 displays document data, the title bar 205 displays a document name. The display area 206 displays the contents of data to be displayed. The display area 206 displays the contents of a document for a document file, or displays a corresponding image or graphic information for an image or graphic file.

In this embodiment, the window can be resized by dragging one of the four borders of the window based on the operation of the operation unit 109, and moving the selected border in a direction perpendicular to that border. That is, in this embodiment, the drag operation corresponds to a window resize instruction operation. As will be described in detail below, the present invention is characterized in that the window resize instruction, including a scroll instruction indicating whether or not to scroll the display contents within the window, is accepted.

Note that this embodiment uses "drag" as a term that represents the concept to be described below. A case will be examined first wherein the mouse shown in FIG. 1B is used as the operation unit 109 to have default settings of Microsoft Windows®. In this case, the display position of a cursor displayed on the screen of the display unit 104 is controlled in response to the movement of the mouse 120. When the user presses the left button 121 while the cursor is located on a target to be selected, that target to be selected is highlighted. In this embodiment, moving the cursor by moving the mouse 120 in this state will be referred to as "dragging".

A case will be examined below wherein the digital pen 130 and tablet 140 shown in FIG. 1C are used as the operation unit 109. In this case, the display position of the cursor displayed on the screen of the display unit 104 is controlled in response to the position of the digital pen 130 pressed against the tablet 140. When the user presses the digital pen 130 against the tablet 140 at a position corresponding to the display position of a target to be selected, the target to be selected is highlighted. In this embodiment, moving the cursor by moving the digital pen 130 on the tablet 140 in this state will be referred to as "dragging".

FIGS. 3A to 3D show display examples according to this embodiment when the user drags the cursor while locating it on the first or second region of the top border 201 or bottom border 202 of the window in the display state of FIG. 2. FIGS. 4A to 4D show display examples according to this embodiment when the user drags the cursor while locating it on the first or second region of the left border 203 or right border 204 of the window in the display state of FIG. 2. Note that a frame indicated by the dotted line in each figure represents a frame corresponding to the window 200 in FIG. 2 before resizing.

As shown in FIGS. 3A and 3C and FIGS. 4A and 4C, when the user drags the cursor while the user locates it on the first region (region 201a, 202a, 203a, or 204a), the display contents near a border (first border) where the cursor is located remain unchanged. On the other hand, the display contents near a border (second border) opposite to the border (first border) where the cursor is located are changed so as to be hidden in turn by the second border.

In FIGS. 3A and 3C and FIGS. 4A and 4C, it can also be considered as if the display contents were moving in correspondence with the movement of the border. In this embodiment, such change in display contents will be referred to as "resizing with scrolling". Also, a state in which the display contents of the display area 206 are moved and displayed in correspondence with the movement of the border will be referred to as "with scrolling", "the display contents are scrolled", or "scrolling the display contents".

As shown in FIGS. 3B and 3D and FIGS. 4B and 4D, when the user drags the cursor while the user locates it on the second region (201b, 202b, 203b, or 204b), the display contents near a border (first border) where the cursor is located are changed. More specifically, the display contents are changed so as to be hidden in turn by the first border. On the other hand, the display contents near a border (second border) opposite to the border (first border) where the cursor is located remain unchanged.

In FIGS. 3B and 3D and FIGS. 4B and 4D, it can also be considered as if the display contents are fixed with respect to the movement of the border. In this embodiment, such change in display contents will be referred to as "resizing without scrolling". A state in which the display contents on the display area 206 are fixedly displayed with respect to the whole display screen will be referred to as "without scrolling", "the display contents are not scrolled", or "not scrolling the display contents".

In this embodiment, "resizing with scrolling" and "resizing without scrolling" can be executed during resizing in a continuous drag operation. That is, the resizing with scrolling and that without scrolling can be switched in real time during a continuous, single drag operation. Hence, the user can resize the window while adjusting the display position.

Figure 5A:
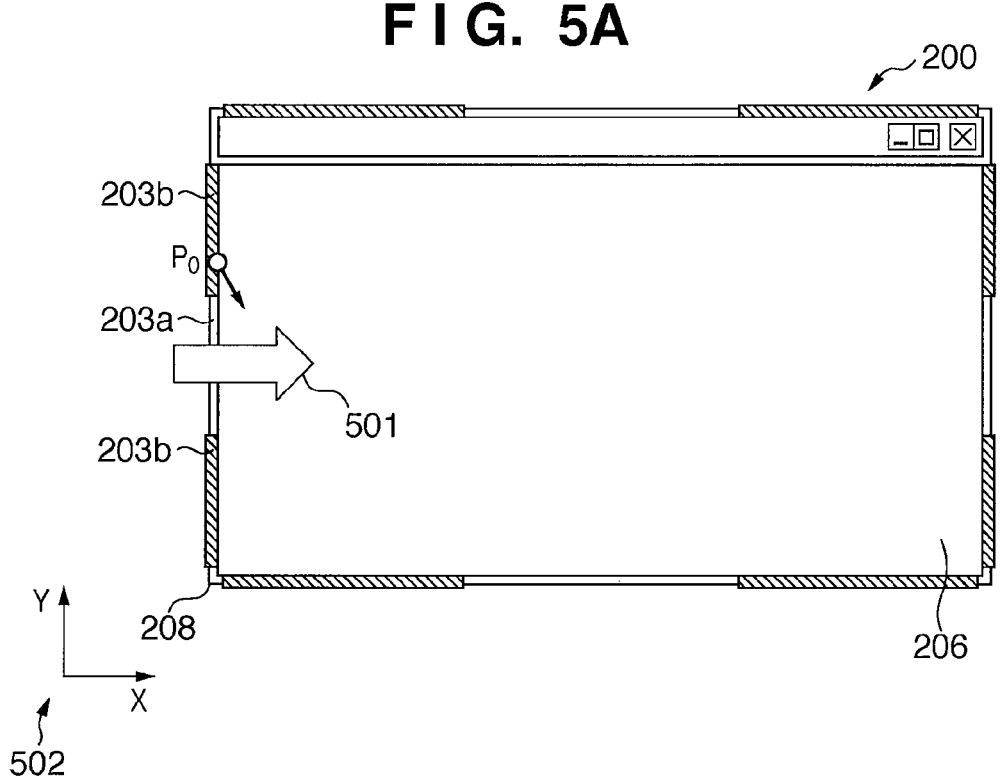
FIG. 5A is a view for explaining ON/OFF switching of scrolling upon resizing according to the first embodiment of the invention.
Figure 5B:
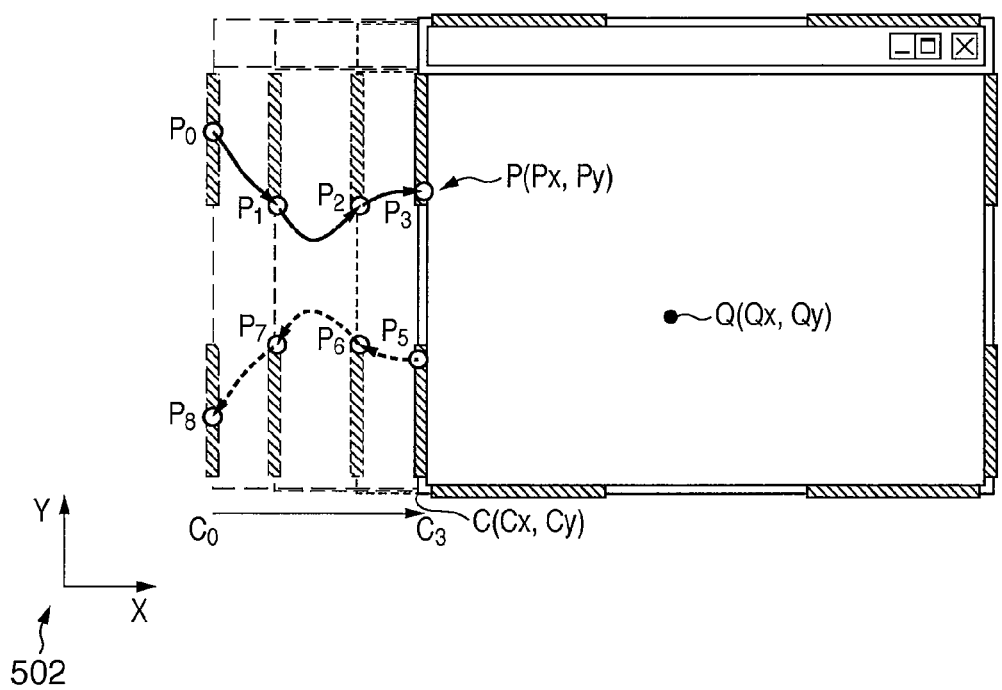
FIG. 5B is a view for explaining ON/OFF switching of scrolling upon resizing when the cursor position is changed from the display state of FIG. 5A.

Switching between the resizing with scrolling and that without scrolling will be described below with reference to FIGS. 5A and 5B. FIGS. 5A and 5B are views for explaining that switching according to this embodiment.

A case will be examined below wherein the user reduces the window 200 by dragging the left border 203 of the window and moving it in a direction of an arrow 501 (right direction), as shown in FIG. 5A. Note that the width and height directions of the window 200 respectively match the X and Y directions of an X-Y coordinate system 502 set on the display screen where the window 200 is displayed. P0 represents an initial position of the cursor.

FIG. 5B expresses a state in which a position P(Px, Py) of the cursor is continuously changed like P0→P1→P2→P3 or P5→P6→P7→P8 during a single drag operation. Note that P(Px, Py) is a coordinate value based on the X-Y coordinate system 502 set on the display screen.

In FIG. 5B, let Ly be the length of the left border 203, and C(Cx, Cy) be the position of the corner 208 corresponding to the lower end of the left border 203 to be dragged. Note that Cx corresponds to the position of the left border 203 in the X direction. Also, let Q(Qx, Qy) be the position of arbitrary display contents on the display area 206 of the window 200. Note that the respective coordinates are based on the aforementioned X-Y coordinate system 502.

While dragging the left border 203, since the position Cx of the left border 203 in the X direction follows an X component of the cursor position (it is not related to a Y component), it can be expressed by:

$$Cx = Px \quad (1)$$

From equation (1), since the cursor is kept located on the left border during dragging, a condition required to locate the cursor on the first region is described by:

$$Ly/3 \leq Py - Cy \leq 2Ly/3$$

Likewise, a condition required to locate the cursor on one of the second regions 203b of the left border 203 is described by:

$$0 < Py - Cy < Ly/3 \text{ or } 2Ly/3 < Py - Cy < Ly$$

Therefore, upon making a drag operation while the cursor is located on the second region to attain the resizing without scrolling, this process can be expressed in association with the point Q by:

$$\Delta Qx = 0 \quad (2)$$

where $\Delta Qx$ is a difference between Qx at the beginning of the resizing without scrolling, and Qx after the window is resized.

Likewise, upon making a drag operation while the cursor is located on the first region to attain the resizing with scrolling, this process can be expressed in association with the position Q by:

$$\Delta Qx = \Delta Cx = \Delta Px \quad (3)$$

where $\Delta Qx$ is a difference between Qx at the beginning of the resizing with scrolling, and Qx after the window size is resized. Likewise, $\Delta Cx$ and $\Delta Px$ are differences between Cx and Px at the beginning of the resizing with scrolling, and Cx and Px after the window is resized. Note that these differences correspond to change amounts of the window 200 in the X direction.

Upon application of the above concept to FIG. 5B, when the cursor position falls within a range from P0 to P1, and from P2 to P3, since the cursor belongs to the second region 203b, $\Delta Qx=0$, and the resizing without scrolling is executed. When the cursor position falls within a range from P1 to P2, since the cursor belongs to the first region 203a, $\Delta Qx=\Delta Px$, and the resizing with scrolling is executed.

That is, while the cursor begins to be dragged from P0 and is continuously dragged to be moved to P3, the position of the left border 203 of the window 200 moves from C0 to C3 according to the X component of the cursor, thus resizing the window. During this operation, the "resizing with scrolling" and "resizing without scrolling" are executed concurrently according to a change in position of the cursor in the Y direction.

The same applies to a case in which the user upsizes the window by moving the cursor position like P5→P6→P7→P8. That is, when the cursor position falls within a range from P5 to P6 and from P7 to P8, since the cursor belongs to the second region 203b, $\Delta Qx=0$, and the resizing without scrolling is executed. When the cursor position falls within a range from P6 to P7, since the cursor belongs to the first region 203a, $\Delta Qx=\Delta Px$, and the resizing with scrolling is executed.

That is, while the cursor begins to be dragged from P5 and is continuously dragged to be moved to P8, the position of the left border 203 of the window 200 moves from C3 to C0 according to the X component of the cursor, thus resizing the window. During this operation, the "resizing with scrolling" and "resizing without scrolling" are executed concurrently according to a change in position of the cursor in the Y direction.

Note that the case has been exemplified in FIG. 5B wherein the left border 203 is dragged. Also, the same applies to the case wherein the top, bottom, and right borders (borders 201, 202, and 204) are dragged.

Figure 6:
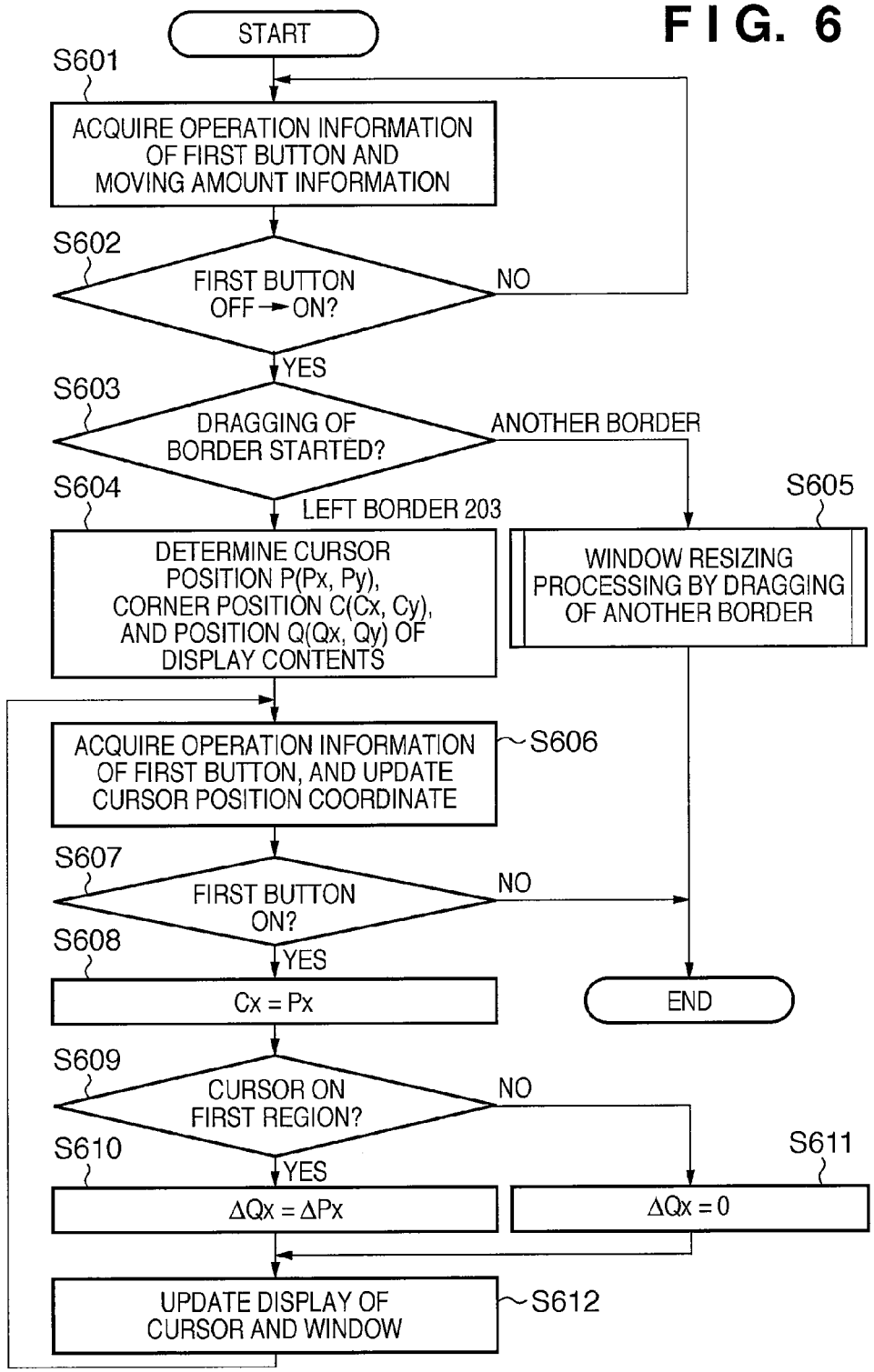
FIG. 6 is a flowchart showing an example of window resizing processing according to the first embodiment of the invention.

The sequence of the aforementioned window resizing processing will be described below with reference to the flowchart of FIG. 6. FIG. 6 is a flowchart showing an example of the window resizing processing according to the first embodiment. The processing corresponding to the flowchart shown in FIG. 6 is implemented when the CPU 101 reads out a corresponding processing program stored in the HD 103 onto the RAM 102 and executes that program to control respective components.

Note that FIG. 6 describes a case wherein the user resizes the window by dragging the left border 203 of the window 200. However, the embodiment of the invention is not limited to the case wherein the left border 203 is dragged. That is, the same processing as in FIG. 6 can resize the window by dragging the top border 201, bottom border 202, and right border 204.

In step S601, the CPU 101 acquires operation information (information of a first instruction operation) of a first button of the mouse 120 or digital pen 130 of the operation unit 109, and information (moving information) of the moving direction and amount of the mouse 120 or digital pen 130. Note that the first button (first operation unit) corresponds to the left button 121 of the mouse 120 if the mouse 120 is used in the default settings of Microsoft Windows®. Also, the first button corresponds to the tip switch 131 at the pen tip of the digital pen 130.

The CPU 101 determines in step S602 based on the operation information of the first button acquired in step S601 whether or not the first button is switched from OFF to ON. If it is determined that the first button is switched to ON ("YES" in step S602), the process advances to step S603. On the other hand, if it is determined that the first button is kept OFF without being switched to ON ("NO" in step S602), the process returns to step S601 to continue the processing.

In step S603, the CPU 101 calculates the position coordinate of the cursor (cursor position coordinate) based on the moving amount information acquired in step S601 to determine on which border of the window 200 the cursor is located. This determination process can be attained by seeing which of predetermined regions set based on the first and second regions of the borders that configure the window 200 includes the cursor position coordinate.

If it is determined that the cursor is located on the left border 203 of the window 200 ("left border" in step S603), it can be determined that the user begins to drag the left border 203. In this case, the process advances to step S604. On the other hand, if the cursor is located on one of the remaining borders (on one of the top border 201, bottom border 202, and right border 204) ("another border" in step S603), it can be determined that the user begins to drag another border. In this case, the process advances to step S605. In step S605, the CPU 101 executes window resizing processing by dragging of another border.

In step S604, the CPU 101 determines the cursor position coordinate P(Px, Py) at the beginning of dragging, as shown in FIG. 5A, for the window which begins to be dragged. Also, the CPU 101 determines the position C(Cx, Cy) of the corner 208 at the lower end of the left border 203 and the position Q(Qx, Qy) of the arbitrary display contents, as shown in FIG. 5B.

In step S606, the CPU 101 further acquires the operation information of the first button and the moving amount information, and updates the cursor position coordinate P(Px, Py) based on the moving amount information. The CPU 101 then determines in step S607 whether or not the first button is kept ON. If the first button is not kept ON but is switched to OFF ("NO" in step S607), this processing ends. In this case, a so-called "drop" operation is made.

On the other hand, if the first switch is kept ON ("YES" in step S607), the process advances to step S608. In step S608, the CPU 101 sets the X position (Cx) of the left border 203 of the window 200 to match the X component (Px) of the cursor position coordinate updated in step S606. In this way, the position of the left border 203 follows the movement of the cursor in the X direction.

The CPU 101 determines in step S609 based on the cursor position coordinate updated in step S606 whether or not the cursor is located on the first region. If it is determined that the cursor is located on the first region ("YES" in step S609), the process advances to step S610. On the other hand, if it is determined that the cursor is located on the second region ("NO" in step S609), the process advances to step S611.

In step S610, the CPU 101 sets the moving amount ΔQx of the position Q of the arbitrary display contents in the X direction to be equal to the moving amount ΔPx of the cursor in the X direction, so as to scroll the display contents upon resizing the window. On the other hand, in step S611, the CPU 101 sets the moving amount ΔQx to be zero so as to suppress scrolling of the display contents upon resizing the window.

In step S612, the CPU 101 updates display of the cursor and window 200 based on the position of the left border 203 determined in step S608 and the moving amount ΔQx determined in step S610 or S611. After that, the process returns to step S606 to continue the processing.

Note that a loop from step S606 to step S612 represents cursor movement during dragging, that is, that dragging is continued and resizing of the window is in progress during this loop. When the control leaves this loop, this represents that the drop operation is made to settle the window size.

As described above, according to this embodiment, since each border of the window is divided into two different regions, and the change method of the display contents within the window can be controlled based on the selected region. Since the region can be selected in real time during resizing of the window, the position of the display contents within the window can be controlled simultaneously with resizing. In this way, a desired display result can be obtained by a series of operations, thus improving the work efficiency.

Second Embodiment

The second embodiment of the invention will be described hereinafter. This embodiment will explain an embodiment that extends the first control technique.

Upon displaying a window on a display unit 104, the following three display states are normally available:

1. a display state in which both the height and width of the window are maximized to fit a whole display screen (so-called full screen display);
2. a display state in which only one icon or title is displayed in a small size (so-called minimum display); and
3. a display state in which the window occupies only a part of the display screen.

The display states 1 and 3 will be compared. In case of the display state 1, since the window itself is fixed, there is no trouble upon handling the window. However, in order to refer to another window, a switching operation for canceling the full screen display state is required.

On the other hand, in case of the display state 3, there is a merit of allowing the user to refer to a plurality of windows, but it is troublesome since the sizes and locations of the respective windows need to be determined and organized. Especially, when a relatively large window completely covers a relatively small window, the user needs to move the upper window to an appropriate location to access the lower window, resulting in inconvenience.

In this embodiment, in order to allow use of a window of a type that considers the merits of both the display states, window display of the first embodiment is applied to so-called "full screen display".

As described above, in "full screen display", a window is maximized in the X and Y directions of the display screen of the display unit 104, and is fixed in size. The window cannot be resized unless the full screen display state is canceled.

By contrast, in the full screen display according to this embodiment, a window is maximized in only one of the X and Y directions within the display screen, and is fixed in size in that direction. In the remaining direction, one border is fixed to the end of the display screen, and only the other border is movable by dragging. By operating this border that can be dragged, the window can be resized in one direction.

Figure 7A:
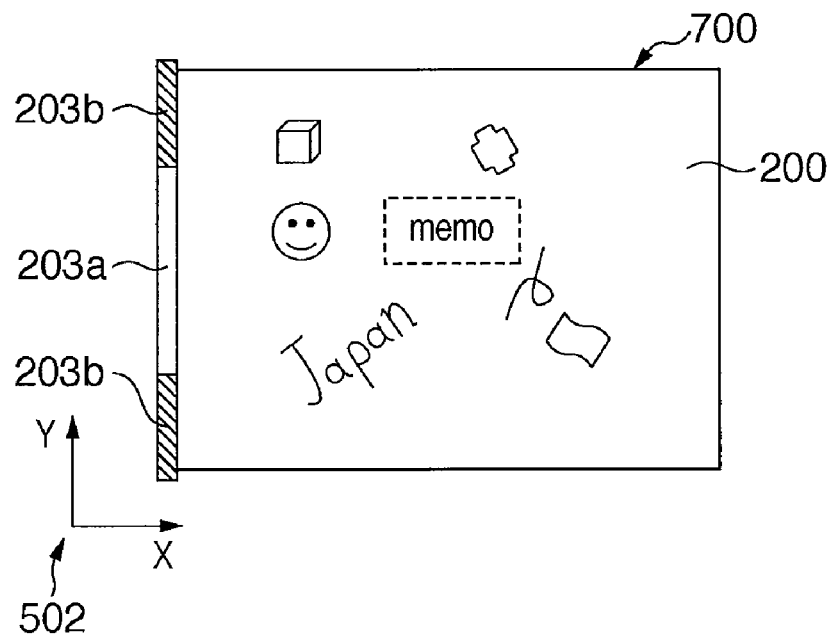
FIG. 7A shows an example of a state in which the size of a window 200 matches that of a whole display screen 700 according to the second embodiment of the invention.
Figure 7B:
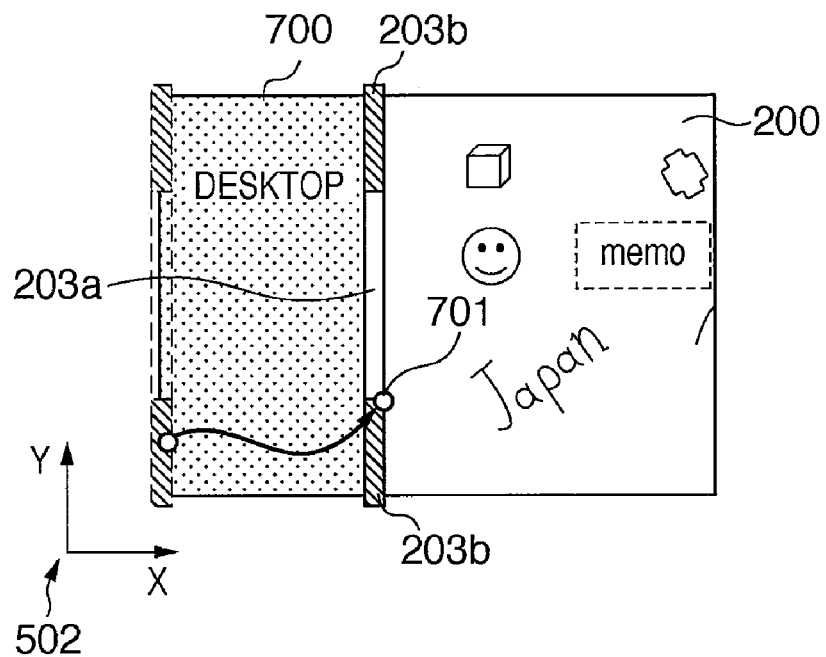
FIG. 7B shows an example of a state in which the size of the window 200 changes when the user locates a cursor 701 on a second region 203b and drags it in the X direction according to the second embodiment of the invention.
Figure 7C:
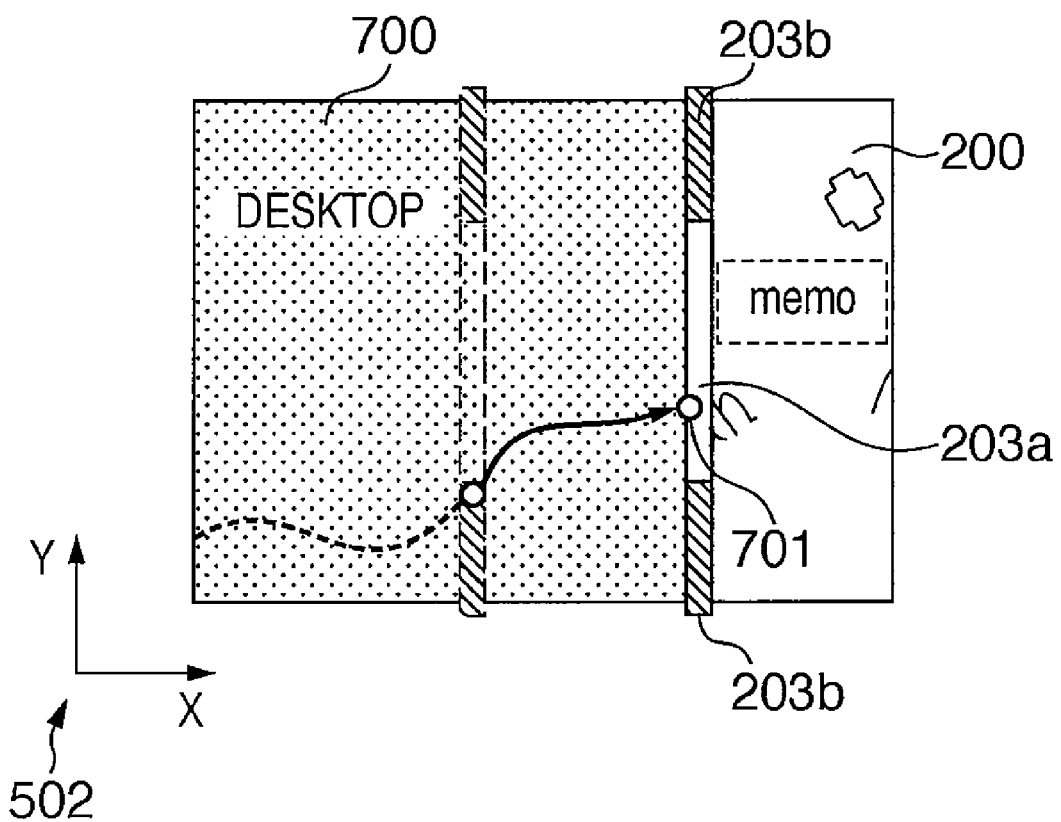
FIG. 7C shows an example of a state in which the size of the window 200 changes when the user locates the cursor 701 on a first region 203a and drags it in the X direction according to the second embodiment of the invention.

FIGS. 7A to 7C show examples of full screen display according to this embodiment. In FIGS. 7A to 7C, reference numeral 700 denotes a whole display screen of the display unit 104. Since the window configuration is the same as that in FIG. 2 of the first embodiment, corresponding reference numerals will be used. A left border 203 of a window 200 includes first region 203a and second regions 203b. The user can drag the first and second regions 203a and 203b using a cursor 701. The directions of the whole display screen 700 and window 200 are determined based on an X-Y coordinate system 502.

FIG. 7A shows a state in which the size of the window 200 matches that of the whole display screen 700. That is, FIG. 7A corresponds to the full screen display state.

FIG. 7B shows a state in which the window 200 is resized when the user locates the cursor 701 on the second region 203b and drags it in the X direction. By dragging in the X direction using the second region 203b, the size of the window 200 changes in only the X direction. At this time, a right border 204 opposite to the dragged left border 203 is fixed to the end of the display area, and only the left border 203 can be dragged. With this movement, the window is resized in one direction. Note that the window 200 is fixed in a maximum size in the Y direction perpendicular to the dragging direction. Note that in case of FIG. 7B, since the second region 203b is used, resizing without scrolling described in the first embodiment is executed.

FIG. 7C shows a state in which the window is resized when the user locates the cursor 701 on the first region 203a and drags it in the X direction. By dragging in the X direction using the first region 203a, the size of the window 200 changes in only the X direction. At this time as well, the right border 204 opposite to the dragged left border 203 is fixed to the end of the display area, and only the left border 203 can be dragged. With this movement, the window 200 is resized in one direction. Note that the window 200 is fixed in a maximum size in the Y direction perpendicular to the dragging direction. Note that resizing with scrolling described in the first embodiment is executed since the first region 203a is used at this time.

Figure 8A:
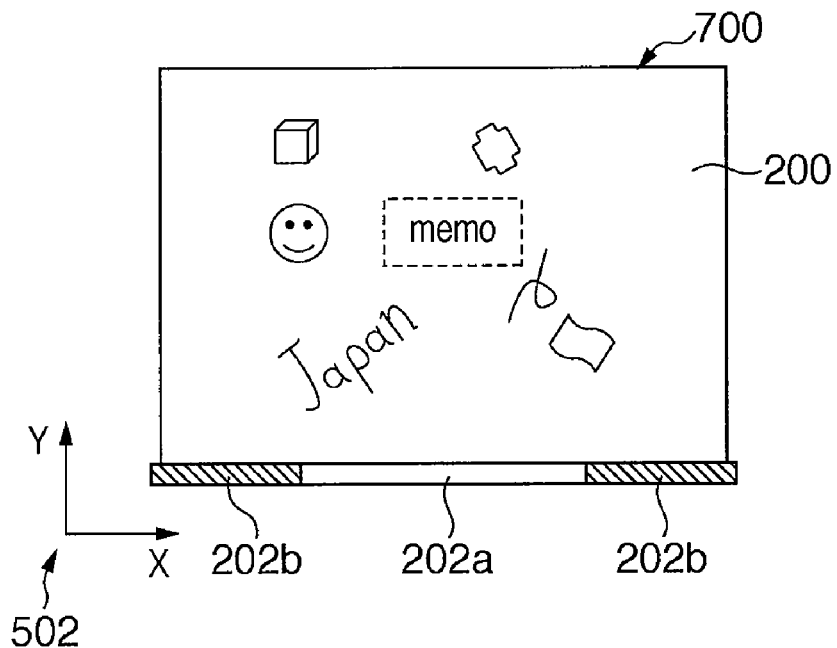
FIG. 8A shows an example of a state in which the size of the window 200 matches that of the whole display screen 700 according to the second embodiment of the invention.
Figure 8B:
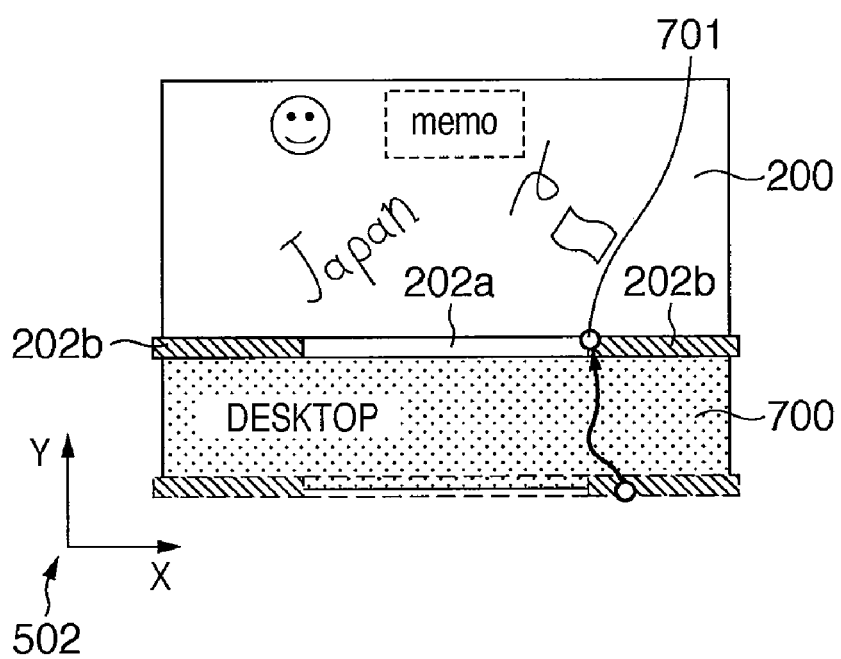
FIG. 8B shows an example of a state in which the size of the window 200 changes when the user locates the cursor 701 on a second region 202b and drags it in the Y direction according to the second embodiment of the invention.
Figure 8C:
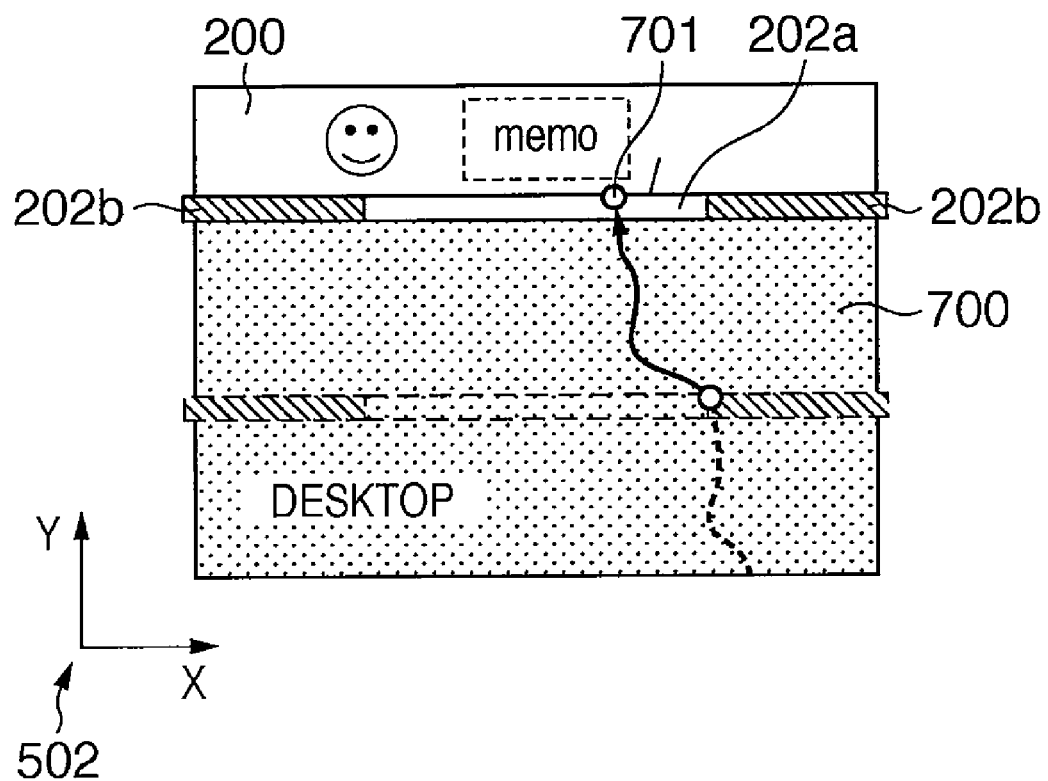
FIG. 8C shows an example of a state in which the size of the window 200 changes when the user locates the cursor 701 on a first region 202a and drags it in the Y direction according to the second embodiment of the invention.

In FIGS. 7A to 7C, the left border 203 is used as a border having a function of resizing the window. However, any of the remaining three borders which configure the window 200 may be used as a border having a function of resizing the window. For example, FIGS. 8A to 8C show a case using a bottom border 202. That is, FIG. 8A shows an example of a state in which the size of the window 200 according to this embodiment matches that of the whole display screen 700. FIG. 8B shows an example of a state in which the window 200 is resized when the user locates the cursor 701 on a second region 202b and drags it in the Y direction according to this embodiment. FIG. 8C shows an example of a state in which the window is resized when the user locates the cursor 701 on a first region 202a and drags it in the Y direction according to this embodiment. One and only difference between FIGS. 8A to 8C and FIGS. 7A to 7C is a border used to resize the window.

Note that in this embodiment, a border that is movable can also be referred to as a "movable border", a border located at a position opposite to the movable border can also be referred to as a "first fixed border (opposing fixed border)", and the remaining two borders can also be referred to as a "second fixed border" and "third fixed border".

In case of FIGS. 7A to 7C, the left border 203 corresponds to the movable border, the right border 204 corresponds to the first fixed border (opposing fixed border), and a top border 201 and the bottom border 202 respectively correspond to the second and third fixed borders. In case of FIGS. 8A to 8C, the bottom border 202 corresponds to the movable border, the top border 201 corresponds to the first fixed border (opposing fixed border), and the left and right borders 203 and 204 respectively correspond to the second and third fixed borders.

Note that the display position on a display area 206 of the window 200 can be controlled in the same manner as in the first embodiment. However, an only difference is that the first and second regions given to all the four borders in the first embodiment are limited to only one border in this embodiment.

As described above, the window according to this embodiment is maintained in a maximized state in one of the X and Y directions (width and height directions). Therefore, upon reordering a plurality of windows, a one-dimensional positional relationship need only be considered. As a result, compared to reordering of windows in consideration of a two-dimensional positional relationship, an operation can be simplified very much, thus greatly eliminating complexity.

Since the window can be resized, a window hidden below the upper window can be displayed compared to a case in which a window is completely maximized in both the X and Y directions, thus improving convenience.

Also, such window can be defined as a fourth window display state in addition to the aforementioned window display states 1 to 3.

Note that the point of this embodiment is not limited to that the window can be resized in one direction in the full screen display state, but it lies in that the display position of the display contents within the window can be controlled at the time of the drag operation in combination with the invention according to the first embodiment.

Third Embodiment

The third embodiment of the invention will be described hereinafter. This embodiment will explain an embodiment which relates to the second control technique.

The aforementioned first embodiment has proposed the display control method upon resizing the window by dragging one of the borders which configure the window. This method is effective in the case in which the window is often resized by mainly dragging the border. Especially, this method is very effective for the window which is maximized in only one direction, as described in the second embodiment.

However, a normal window can be resized by dragging one of its corners, as shown in FIGS. 23A to 23D. Whether each user drags the border or corner to resize such normal window depends on favor of the user, the display contents of individual applications, individual work contents, and the like.

This embodiment proposes a method that can control ON/OFF of scrolling during resizing in real time as in the first embodiment even upon resizing a window by dragging its corner.

In the display control method according to the aforementioned first embodiment, upon resizing a window by dragging its border, ON/OFF switching of scrolling upon resizing is controlled based on the cursor position in the direction perpendicular to the dragging direction. However, upon resizing a window by dragging its corner, the cursor movement needs to be instructed two-dimensionally. That is, since both the X and Y components of the cursor movement get directly involved in the movement of the corner, one component of the cursor movement cannot be used in switching control between resizing with scrolling and that without scrolling.

Hence, this embodiment uses ON/OFF of a second button of a mouse 120 or digital pen 130 of an operation unit 109 in switching control between resizing with scrolling and that without scrolling upon resizing a window. Note that the second button (second operation unit) corresponds to a right button 122 of the mouse 120 in the default settings of Microsoft Windows®. On the other hand, the second button corresponds to a side switch 132 on the side surface of the digital pen 130. Also, the second button may be assigned to a specific key such as a control key.

Figure 9A:
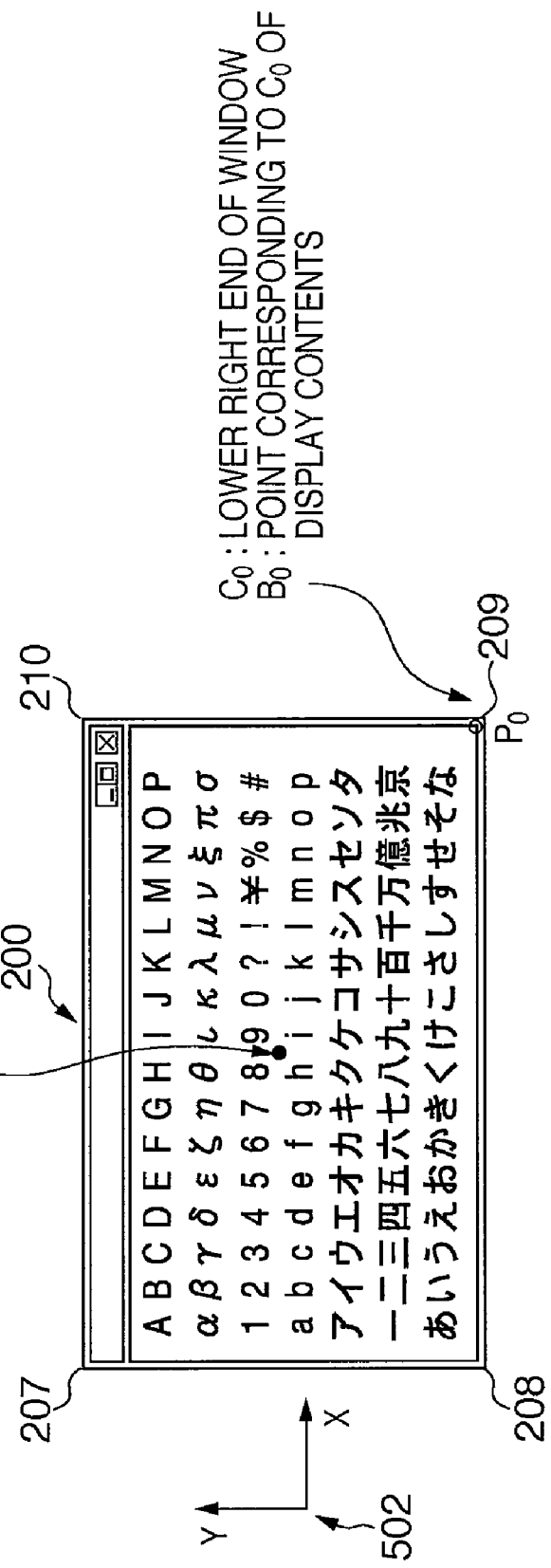
FIG. 9A shows an example of a state before the beginning of dragging when the user locates a cursor P on a corner 209 (P0) in a display control method according to the third embodiment of the invention.
Figure 9B:
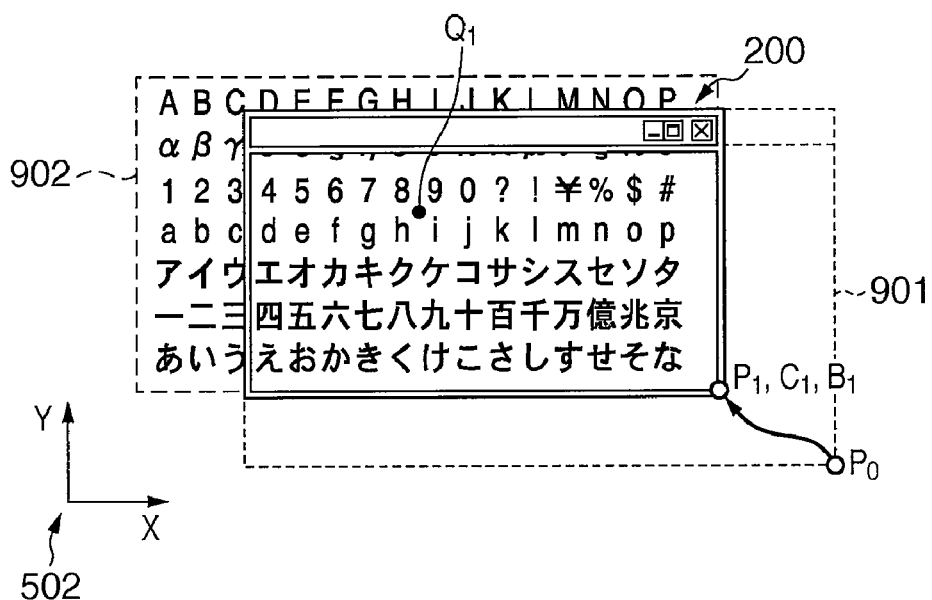
FIG. 9B shows an example of a state in which the user moves the cursor P from the position P0 on the corner 209 to a position P1 in the display control method according to the third embodiment of the invention.
Figure 9C:
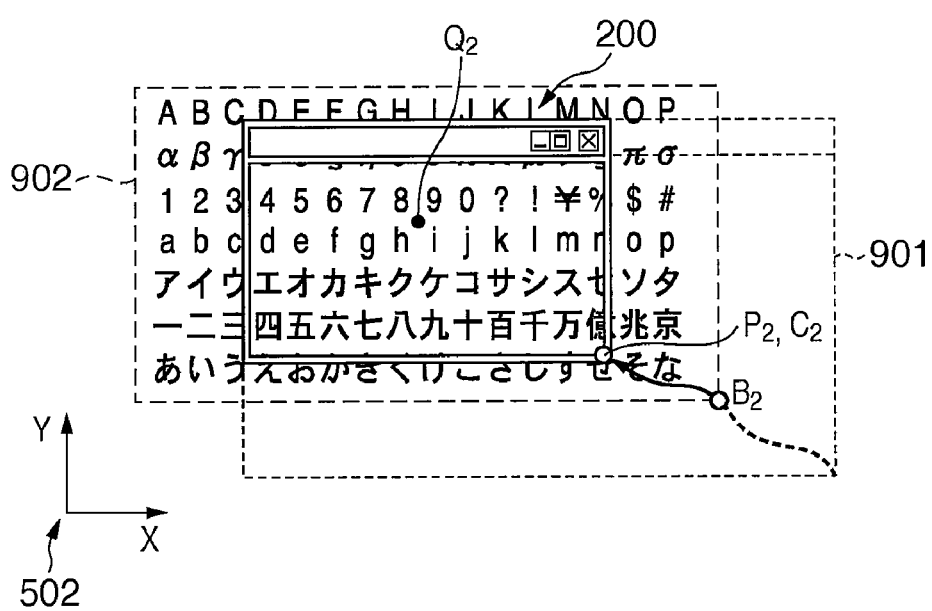
FIG. 9C shows an example of a state in which the user moves the cursor P from P1 to P2 in the display control method according to the third embodiment of the invention.

The operation of the display control method according to this embodiment will be described below with reference to FIGS. 9A to 9C. FIG. 9A shows a state before the beginning of dragging, in which the user locates a cursor P on a corner 209 (P0). FIG. 9B shows a state in which the user moves the cursor P from the position P0 to a position P1 of the corner 209. Upon this cursor movement, the user turns on the second button to execute the resizing with scrolling. Furthermore, FIG. 9C shows a state in which the user moves the cursor P from P1 to P2. Upon this cursor movement, the user turns off the second button to execute the resizing without scrolling.

Note that a dotted line 901 in FIGS. 9B and 9C indicates the size of a window 200 before resizing. The contents within a dotted line 902 indicate the display contents falling outside the window 200 after resizing.

It should be noted that the first button is kept ON during dragging irrespective of ON/OFF of the second button.

FIGS. 9A to 9C are views for explaining the display control method of this embodiment by adopting the configuration of the window corresponding to FIG. 2, but they omit descriptions of first and second regions for the sake of simplicity. Note that the third embodiment can be practiced in combination with the first embodiment, and this embodiment can be applied to the window shown in FIG. 2, which has the first and second regions, just in case.

This embodiment can assure similar operations on any of four corners 207 to 210 of the window 200, and the following description will be given taking as an example a case in which the user drags the lower right corner 209.

In FIGS. 9A to 9C, parameters are defined as follows. Let C(Cx, Cy) be the position of the corner 209 of the window 200, B(Bx, By) be the position of a point corresponding to that immediately below the point C in an initial state of the display contents within the window, and Q(Qx, Qy) be the position of arbitrary display contents within the window. Note that respective coordinate values are based on an X-Y coordinate system 502 set with respect to the display screen. Assume that the position C changes like C0, C1, and C2, the position B changes like B0, B1, and B2, and the position Q changes like Q0, Q1, and Q2 in correspondence with the movement of the cursor position from P0 to P1 and to P2.

At the beginning of dragging, as shown in FIG. 9A, the user locates the cursor position P at the position of the lower right corner 209, and switches the first button from OFF to ON there. At this time, P0=C0=B0.

During the movement of the cursor position from P0 to P1 after the beginning of dragging in FIG. 9B, the corner 209 of the window 200 moves to follow the cursor, and the display contents within a display area 206 also move to follow the cursor (since they are scrolled). At this time, P1=C1=B1. That is, the relationship among P, C, B, and Q can be expressed by:

$$\Delta C(\Delta Cx, \Delta Cy) = \Delta P(\Delta Px, \Delta Py) \quad (4)$$

$$\Delta B(\Delta Bx, \Delta By) = \Delta P(\Delta Px, \Delta Py) \quad (5)$$

$$\Delta Q(\Delta Qx, \Delta Qy) = \Delta P(\Delta Px, \Delta Py) \quad (6)$$

where Δ indicates a change amount.

Furthermore, during the movement of the cursor position from P1 to P2 in FIG. 9C, the corner 209 of the window similarly moves to follow the cursor P. However, the display contents within the display area 206 do not follow the cursor movement since they are not scrolled in this case. At this time, P2=C2≠B2 (=B1). That is, the relationship among P, C, B, and Q can be expressed by:

$$\Delta C(\Delta Cx, \Delta Cy) = \Delta P(\Delta Px, \Delta Py) \quad (7)$$

$$\Delta B(\Delta Bx, \Delta By) = (0,0) \quad (8)$$

$$\Delta Q(\Delta Qx, \Delta Qy) = (0,0) \quad (9)$$

Figure 10:
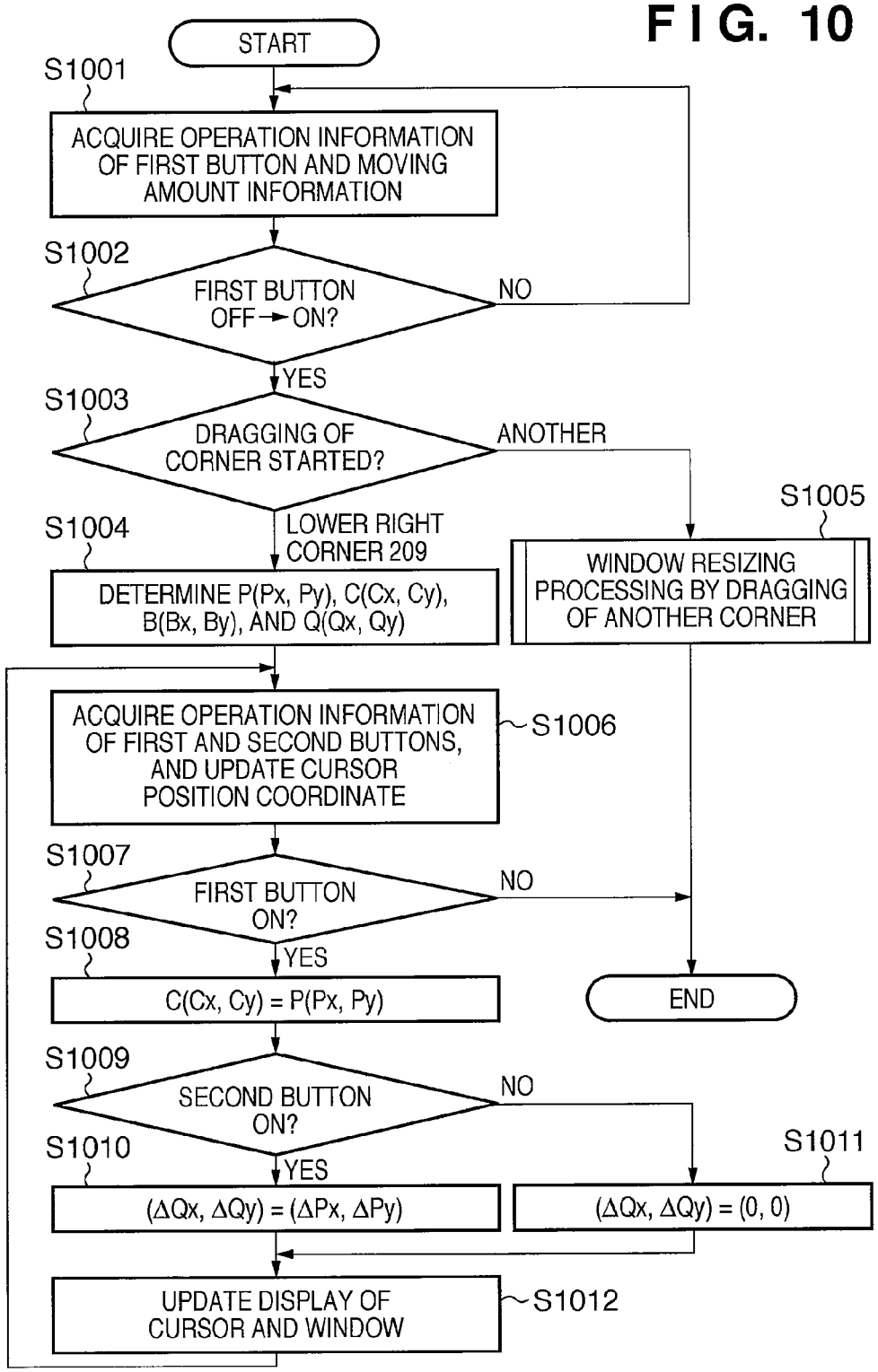
FIG. 10 is a flowchart showing an example of window resizing processing according to the third embodiment of the present invention.

The sequence of the aforementioned window resizing processing will be described below with reference to the flowchart of FIG. 10. FIG. 10 is a flowchart showing an example of the window resizing processing according to the third embodiment. The processing corresponding to the flowchart shown in FIG. 10 is implemented when a CPU 101 reads out a corresponding processing program stored in an HD 103 onto a RAM 102 and executes that program to control respective components.

Note that FIG. 10 describes a case in which the user resizes the window by dragging the lower right corner 209 of the window 200. The embodiment of the invention is not limited to the case in which the lower right corner 209 is dragged. That is, the same processing as in FIG. 10 can resize the window by dragging the upper left corner 207, lower left corner 208, and upper right corner 210.

In step S1001, the CPU 101 acquires operation information (information of a first instruction operation) of a first button of the mouse 120 or digital pen 130 of the operation unit 109, and information (moving information) of the moving direction and amount of the mouse 120 or digital pen 130. Note that the first button corresponds to the left button 121 of the mouse 120 if the mouse 120 is used in the default settings of Microsoft Windows®. Also, the first button corresponds to a tip switch 131 at the pen tip of the digital pen 130.

The CPU 101 determines in step S1002 based on the operation information of the first button acquired in step S1001 whether or not the first button is switched from OFF to ON. If it is determined that the first button is switched to ON ("YES" in step S1002), the process advances to step S1003. On the other hand, if it is determined that the first button is kept OFF without being switched to ON ("NO" in step S1002), the process returns to step S1001 to continue the processing.

In step S1003, the CPU 101 calculates the position coordinate of the cursor P (cursor position coordinate) based on the moving amount information acquired in step S1001 to determine on which corner of the window 200 the cursor is located. This determination process can be attained by seeing which of predetermined regions set based on the corners that configure the window 200 includes the cursor position coordinate.

If it is determined that the cursor is located on the lower right corner 209 of the window 200 ("lower right corner 209" in step S1003), it can be determined that the user begins to drag the lower right corner 209. In this case, the process advances to step S1004. On the other hand, if the cursor is located on one of the remaining corners (on one of the corners 207, 208, and 210) ("another" in step S1003), it can be determined that the user begins to drag another corner. In this case, the process advances to step S1005. In step S1005, the CPU 101 executes window resizing processing by dragging of another corner.

In step S1004, the CPU 101 determines the position coordinates P(Px, Py), C(Cx, Cy), B(Bx, By), and Q(Qx, Qy) at the beginning of dragging, as shown in FIG. 9A, for the window which begins to be dragged. Note that the definitions of respective coordinates are the same as those described above.

In step S1006, the CPU 101 further acquires the information of the first instruction operation and moving amount information, and also operation information of a second button (information of a second instruction operation) of the mouse 120 or digital pen 130 of the operation unit 109. Also, the CPU 101 updates the cursor position coordinate P(Px, Py) based on the moving amount information. The CPU 101 then determines in step S1007 whether or not the first button is kept ON. If the first button is not kept ON but is switched to OFF ("NO" in step S1007), this processing ends. In this case, a so-called "drop" operation is made.

On the other hand, if the first switch is kept ON ("YES" in step S1007), the process advances to step S1008. In step S1008, the CPU 101 sets the position C(Cx, Cy) of the lower right corner 209 of the window 200 to match the cursor position P(Px, Py) updated in step S1006. In this way, the position of the lower right corner 209 follows the cursor movement.

The CPU 101 determines in step S1009 based on the operation information of the second button acquired in step S1006 whether or not the second button is ON. If it is determined that the second button is ON ("YES" in step S1009), the process advances to step S1010. On the other hand, if it is determined that the second button is OFF ("NO" in step S1009), the process advances to step S1011.

In step S1010, the CPU 101 sets the moving amount ΔQ(ΔQX, ΔQy) of the position Q of the arbitrary display contents to be equal to the moving amount ΔP(ΔPx, ΔPy) of the cursor. In this way, the display contents are scrolled by a size corresponding to the change amounts of the window 200 in the X and Y directions. On the other hand, in step S1011, the CPU 101 sets the moving amount ΔQ to be (0, 0). In this case, the display contents are not scrolled.

In step S1012, the CPU 101 updates display of the cursor and window 200 based on the position of the lower right corner 209 determined in step S1008 and the moving amount ΔQ determined in step S1010 or S1011. After that, the process returns to step S1006 to continue the processing.

Note that a loop from step S1006 to step S1012 represents cursor movement during dragging, that is, that dragging is continued and resizing of the window is in progress during this loop. When the control leaves this loop, this represents that the drop operation is made to settle the window size.

As described above, according to this embodiment, the two different operation buttons of the operation unit 109 are used, and the change method of the display contents within the window can be controlled based on combinations of the button operations. Since the combinations of the button operations can be changed in real time during resizing of the window, the position of the display contents within the window can be controlled simultaneously with resizing. In this way, a desired display result can be obtained by a series of operations, thus improving the work efficiency.

Note that the case has been explained wherein the window is resized by mainly dragging the corner of the window. However, the display control method according to this embodiment can be applied to a case wherein the window is resized by dragging its border. In this case, ON/OFF of scrolling upon resizing can be controlled by the same operations in case of dragging the corner and that of dragging the border.

Note that the display control method (first control technique) according to the first embodiment and that (second control technique) according to this embodiment can be compared as follows.

The first control technique is effective upon attaching importance to resizing by dragging a border, and is especially effective in case of the second embodiment. In consideration of only the case of dragging the border, the first control technique can achieve the desired resizing by a simpler operation than the second control technique.

By contrast, the second control technique is effective for the case including probability of dragging of both the corner and border, and the case that also attaches importance to dragging of the corner. Using the second control technique, the desired resizing can be achieved by common operation to the case of dragging the corner and that of dragging the border.

Fourth Embodiment

The fourth embodiment of the invention will be described hereinafter. This embodiment will explain an embodiment that relates to the aforementioned third control technique.

This embodiment will explain display control of the present invention, which is applied to a case in which a window includes a plurality of sub-windows, and each sub-window is resized by dragging a boundary between the neighboring sub-windows.

Figure 11:
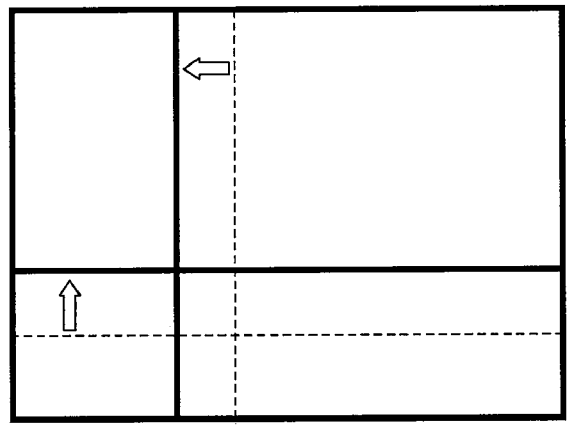
FIG. 11 shows an example of a window including a plurality of sub-windows.

Some applications display using a window defined by a single area, and some other applications display using a window including a plurality of sub-windows. FIG. 11 shows an example of the latter application. In this case, using the plurality of sub-windows, the display efficiency can be improved compared to a case of a single window, and a more comfortable user interface can be provided.

When a window includes a plurality of sub-windows, it is a common practice to resize each sub-window in the window by dragging a boundary between the neighboring sub-windows. At this time, in the conventional window configuration, ON/OFF of scrolling upon resizing needs to be determined in advance for each sub-window in case of resizing, or a scroll operation needs to be done after resizing.

For example, the left or top part of the display contents in each sub-window is preferentially displayed in some cases. This is based on the same situation as a window defined by a single area, that is, the idea that the first character of a sentence and the first line of a page are to be preferentially displayed.

Therefore, in an example of a window divided into left and right sub-windows, upon resizing the sub-windows by dragging a boundary, the display contents of the left sub-window are not scrolled, and those of the right sub-window are scrolled. Likewise, in an example of a window divided into upper and lower sub-windows, the display contents of the upper sub-window are not scrolled, and those of the lower sub-window are scrolled.

By contrast, this embodiment provides a display control method that allows to concurrently switch ON/OFF of scrolling of sub-windows on two sides of a boundary in real time during resizing upon resizing by dragging the boundary. Hence, in this embodiment, the need for fixing ON/OFF of scrolling in advance can be obviated unlike in the related art.

Display control processing according to this embodiment will be described below. In this embodiment, in order to control whether or not to scroll the display contents for each sub-window, the following four control modes are available. Note that a case will be examined below wherein a window includes a sub-window on the first side with respect to a boundary, and that on the second side.

Control mode 1. resizing with scrolling of both the sub-windows on the first and second sides Control mode 2. resizing with scrolling of the sub-window on the first side and that without scrolling of the sub-window on the second side Control mode 3. resizing without scrolling of the sub-window on the first side and that with scrolling of the sub-window on the second side Control mode 4. resizing without scrolling of both the sub-windows on the first and second sides Note that the relationship between the sub-windows on the first and second sides can be considered as that between neighboring sub-windows on, for example, the left and right sides or the upper and lower sides of the boundary.

Figure 12:
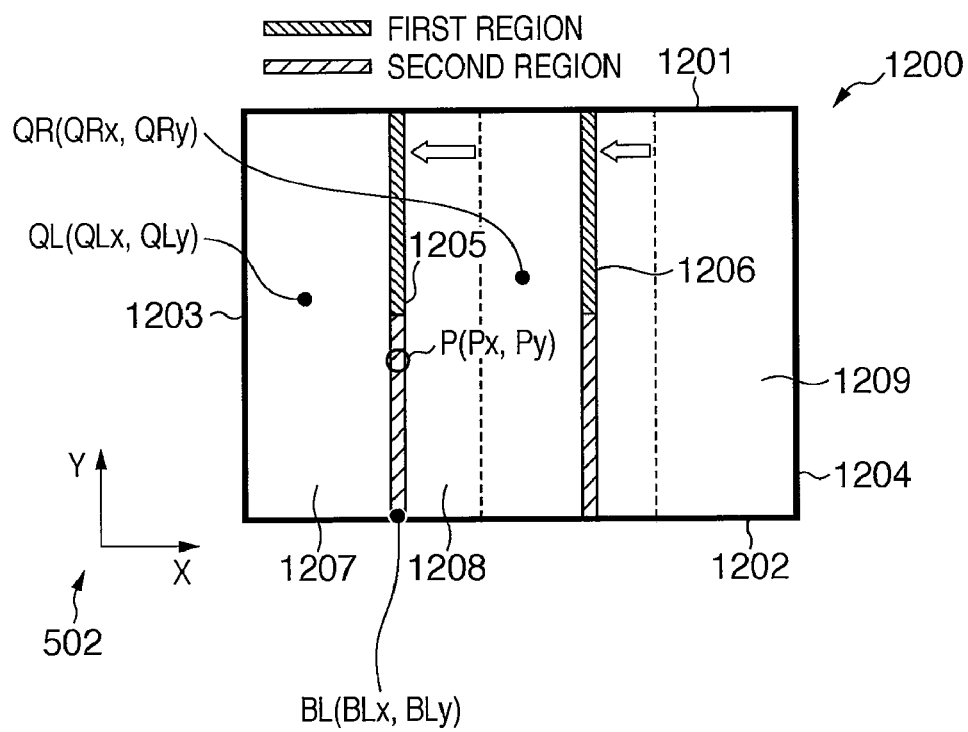
FIG. 12 is a view for explaining the fourth embodiment of the invention taking as an example a window which is divided into left and right sub-windows as first and second sub-windows.

FIG. 12 is a view for explaining this embodiment taking as an example a window which is divided into left and right sub-windows as the first and second sub-windows. Note that the boundary that the user can drag is one boundary per drag operation, and the same display control applies to a window divided into upper and lower sub-windows as in that divided into the left and right sub-windows.

In FIG. 12, a window 1200 is defined by borders 1201, 1202, 1203, and 1204, and has sub-windows 1207, 1208, and 1209 partitioned by boundaries 1205 and 1206.

Each of the boundaries 1205 and 1206 is divided into two regions. In FIG. 12, the upper half region is called a first region, and the lower half region is called a second region. Note that the division method is merely an example, and is not limited to that shown in FIG. 12. For example, the same division method of each border in the first embodiment may be adopted.

In FIG. 12, the position of a cursor P can be expressed by P(Px, Py) based on an X-Y coordinate system 502 set on the display screen on which the window 1200 is displayed. Let LBy be the length of the boundary 1205 within the window 1200, and BL(BLx, BLy) be the position of an intersection between the lower end of the boundary 1205 and the lower border 1202. Note that BLx corresponds to the position of the boundary 1205 in the X direction.

Note that a condition (condition 1) required to locate the cursor P on the first region is described by:

$$LBy/2 \leq Py - BLy \leq LBy$$

Likewise, a condition (condition 2) required to locate the cursor P on the second region is described by:

$$0 < Py - BLy < LBy/2$$

Let QL(QLX, QLy) be the position of arbitrary display contents within the sub-window 1207 on the left side of the boundary 1205, and QR(QRx, QRy) be the position of arbitrary display contents within the sub-window 1208 on the right side. The boundary 1205 will be described below. However, the scroll control of the display contents upon resizing the sub-windows with reference to the boundary 1206 can be similarly executed.

Upon execution of resizing without scrolling of the sub-windows in case of a drag operation, the following expression can be made in association with the positions QL and QR:

$$\Delta QLx = \Delta QRx = 0 \quad (10)$$

where $\Delta QLx$ and $\Delta QRx$ are differences of QLx and QRx before and after resizing of the sub-windows.

Likewise, upon execution of resizing with scrolling of the sub-windows, the following expression can be made in association with the positions QL and QR:

$$\Delta QLx = \Delta QRx = \Delta Px \quad (11)$$

where $\Delta QLx$ and $\Delta QRx$ are differences of QLx and QRx before and after resizing of the sub-windows. Likewise, $\Delta Px$ is a difference of Px before and after resizing of the sub-windows. Note that these differences correspond to the change amounts of the boundary 1205 in the X direction.

In this embodiment, the four types of resizing control of the control modes 1 to 4 are switched by combining dragging of the cursor which is located on either the first or second region, and ON/OFF of the second button operation.

In the control mode 1, the cursor located on the first region is dragged, and the second button is ON.

In the control mode 2, the cursor located on the first region is dragged, and the second button is OFF.

In the control mode 3, the cursor located on the second region is dragged, and the second button is ON.

In the control mode 4, the cursor located on the second region is dragged, and the second button is OFF.

In this way, the display control method according to this embodiment simultaneously uses control based on the position of the cursor in the Y direction used in the first and second embodiments, and control based on the second button of the operation unit 109 used in the third embodiment in cooperation with each other. In case of any of the above four patterns, switching between resizing with scrolling and that without scrolling for each of the sub-windows on the two sides is controlled concurrently during the single, continuous drag operation and cursor movement. The start and continuation of dragging are controlled by ON/OFF of the first button of the operation unit 109 as in the above embodiments.

Figure 13:
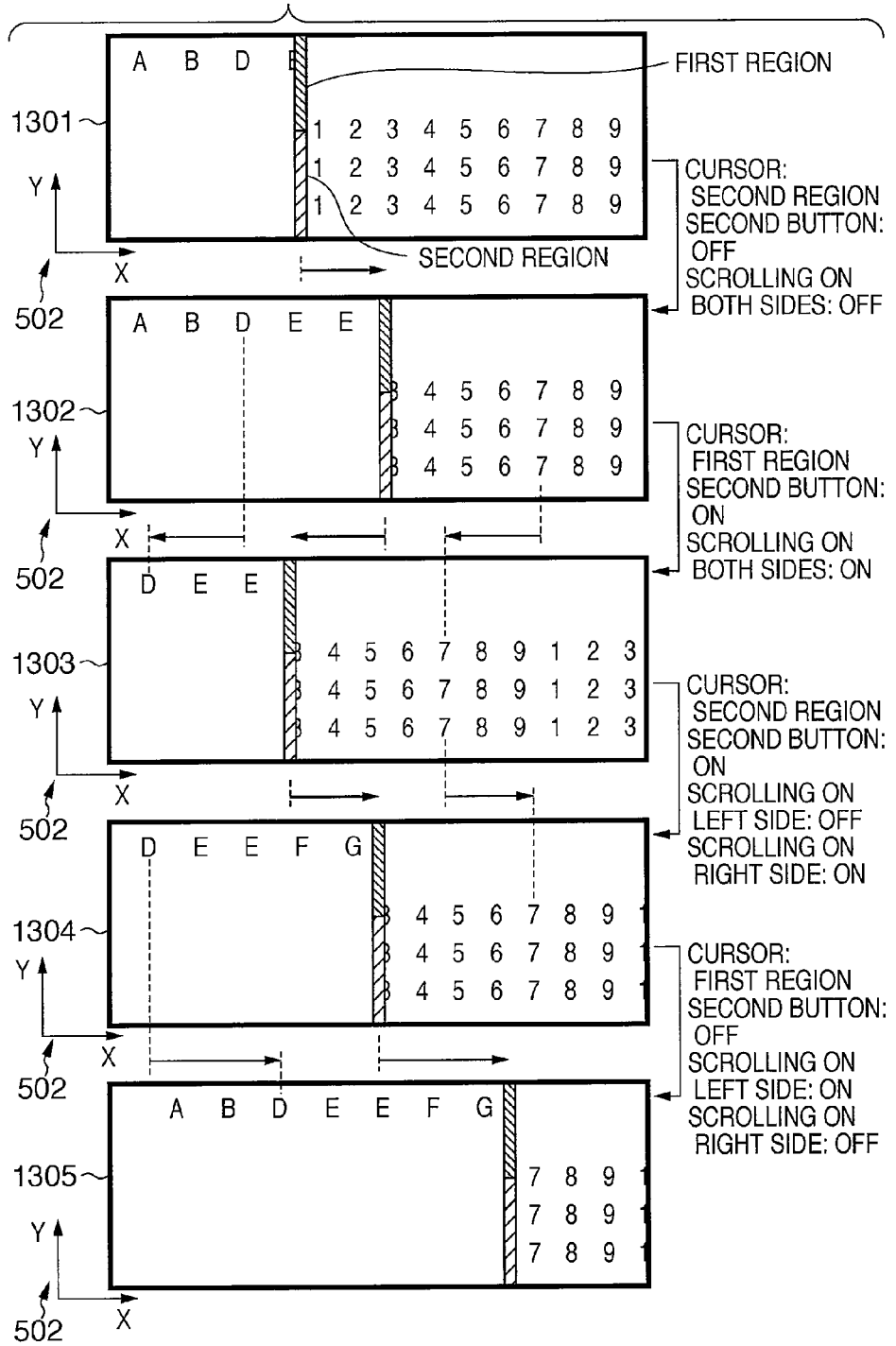
FIG. 13 shows an example of a change in display contents when the user moves a boundary in a window divided by one boundary according to the fourth embodiment of the invention.

FIG. 13 shows an example of a change in display contents when the user moves a boundary on a window divided by the single boundary.

In FIG. 13, reference numeral 1301 denotes a state before beginning of dragging. In this state, a left sub-window displays alphabetical letters "ABD", and a right sub-window displays three rows of numerals "1" to "9".

In this display state of the window 1301, when the user locates the cursor on the second region, and drags it while the second button is OFF, a display state of a window 1302 is set. At this time, since both the left and right sub-windows are not scrolled, letters "EE" hidden on the left sub-window are newly displayed. On the other hand, on the right sub-window, "1" and "2" are fully hidden and "3" is partially hidden by the movement of the boundary.

When the user locates the cursor on the first region and drags it while the second button is ON, a display state of a window 1303 is set. Since both the left and right sub-windows are scrolled, the display contents near the boundary remain unchanged, but those near the left and right borders of the window are changed.

Furthermore, when the user locates the cursor on the second region and drags it while the second button is ON, a display state of a window 1304 is set. At this time, only the right sub-window is scrolled. Hence, alphabetical letters "FG" hidden on the left sub-window are newly displayed near the boundary. On the other hand, on the right sub-window, numerals "1 2 3" near the right border of the window, which were displayed on the window 1303, are hidden.

Moreover, when the user locates the cursor on the first region and drags it while the second button is OFF, a display state like a window 1305 is set. At this time, only the left sub-window is scrolled. Hence, on the left sub-window, alphabetical letters "AB" hidden near the left border of the window are displayed. On the other hand, since the right sub-window is not scrolled, numerals "3 4 5 6" are hidden by the boundary.

Figure 14:
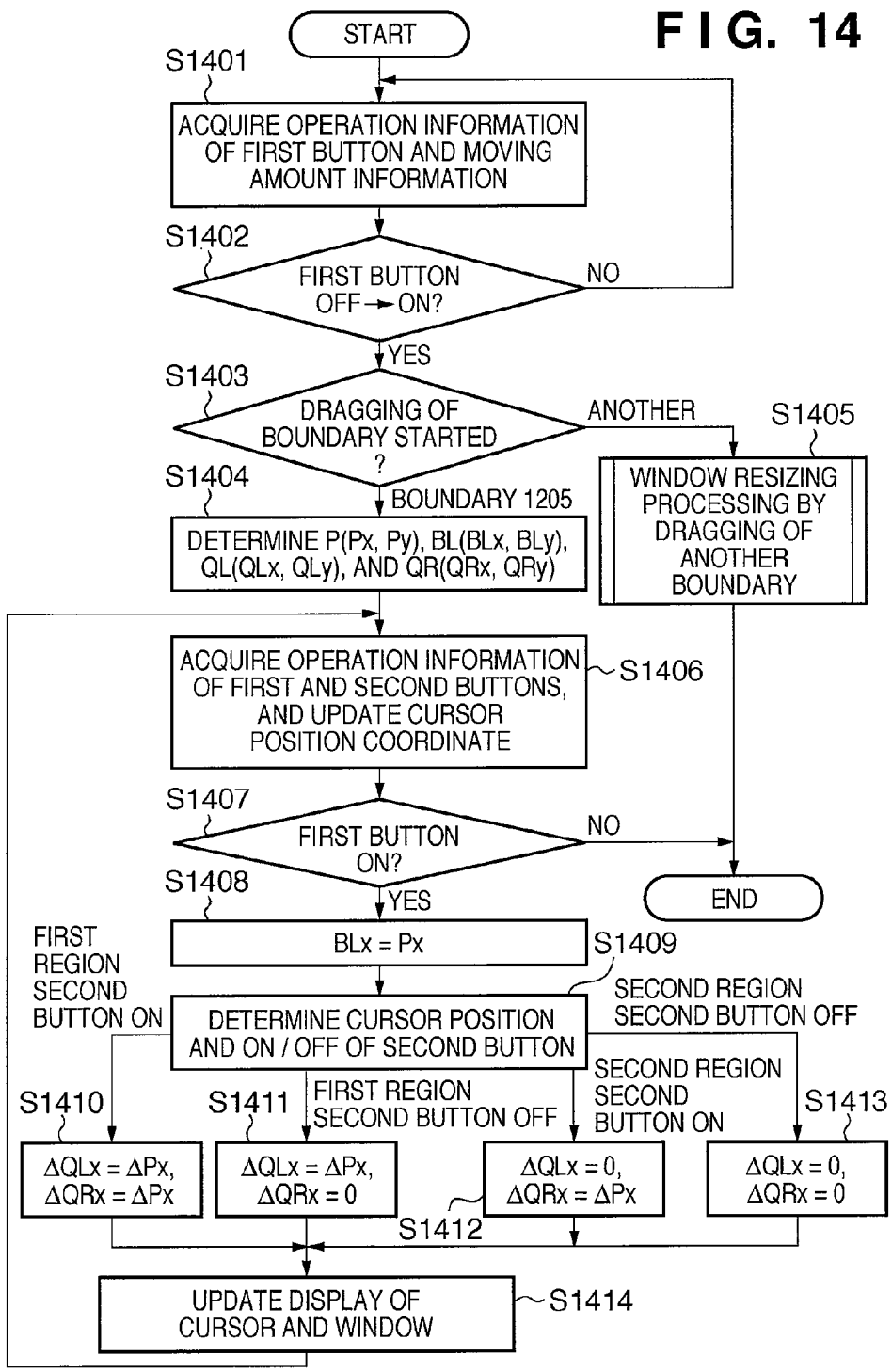
FIG. 14 is a flowchart showing an example of window resizing processing according to the fourth embodiment of the invention.

The sequence of the aforementioned window resizing processing will be described below with reference to the flowchart of FIG. 14. FIG. 14 is a flowchart showing an example of the window resizing processing according to the fourth embodiment. The processing corresponding to the flowchart shown in FIG. 14 is implemented when a CPU 101 reads out a corresponding processing program stored in an HD 103 onto a RAM 102 and executes that program to control respective components.

Note that FIG. 14 describes a case in which the user resizes the sub-windows by dragging the boundary 1205 of the window 1200. However, the embodiment of the invention is not limited to the case in which the boundary 1205 is dragged. That is, the same processing as in FIG. 14 can resize the sub-windows by dragging the boundary 1206 or another boundary.

In step S1401, the CPU 101 acquires operation information (information of a first instruction operation) of a first button of a mouse 120 or digital pen 130 of the operation unit 109, and information (moving information) of the moving direction and amount of the mouse 120 or digital pen 130. Note that the first button corresponds to a left button 121 of the mouse 120 if the mouse 120 is used in the default settings of Microsoft Windows®. Also, the first button corresponds to a tip switch 131 at the pen tip of the digital pen 130.

The CPU 101 determines in step S1402 based on the operation information of the first button acquired in step S1401 whether or not the first button is switched from OFF to ON. If it is determined that the first button is switched to ON ("YES" in step S1402), the process advances to step S1403. On the other hand, if it is determined that the first button is kept OFF without being switched to ON ("NO" in step S1402), the process returns to step S1401 to continue the processing.

In step S1403, the CPU 101 calculates the position coordinate of the cursor P (cursor position coordinate) based on the moving amount information acquired in step S1401 to determine on which boundary of the window 1200 the cursor is located. This determination process can be attained by seeing which predetermined region set based on the boundaries included in the window 1200 includes the cursor position coordinate.

If it is determined that the cursor is located on the boundary 1205 of the window 1200 ("boundary 1205" in step S1403), it can be determined that the user begins to drag the boundary 1205. In this case, the process advances to step S1404. On the other hand, if the cursor is located on one of the remaining boundaries (on the boundary 1206 or the like) ("another" in step S1403), it can be determined that the user begins to drag another boundary. In this case, the process advances to step S1405. In step S1405, the CPU 101 executes window resizing processing by dragging of another boundary.

In step S1404, the CPU 101 determines the position coordinates P(Px, Py), BL(BLx, BLy), QL(QLx, QLy), and QR(QRx, QRy) at the beginning of dragging, as shown in FIG. 12, for the window which begins to be dragged. Note that the definitions of respective coordinates are the same as those described above.

In step S1406, the CPU 101 further acquires the information of the first instruction operation and moving amount information, and also operation information of the second button (information of a second instruction operation) of the mouse 120 or digital pen 130 of the operation unit 109. Also, the CPU 101 updates the cursor position coordinate P(Px, Py) based on the moving amount information. The CPU 101 then determines in step S1407 whether or not the first button is kept ON. If the first button is not kept ON but is switched to OFF ("NO" in step S1407), this processing ends. In this case, a so-called "drop" operation is made.

On the other hand, if the first switch is kept ON ("YES" in step S1407), the process advances to step S1408. In step S1408, the CPU 101 sets the X component BLx of the end position BL of the boundary 1205 to match the X component Px of the cursor position P updated in step S1406. In this way, the position of the boundary 1205 follows the cursor movement.

The CPU 101 determines in step S1409 based on the coordinate Py of the cursor position in the Y direction obtained in step 1406 on which of the first and second regions the cursor P is located and based on the operation information of the second button if the second button is ON.

If the cursor P is located on the first region, and the second button is ON, the process advances to step S1410. If the cursor P is located on the first region, and the second button is OFF, the process advances to step S1411. Furthermore, if the cursor P is located on the second region, and the second button is ON, the process advances to step S1412. Moreover, if the cursor P is located on the second region, and the second button is OFF, the process advances to step 1413.

In step S1410, the CPU 101 sets the moving amount ΔQLx of the position QL of the arbitrary display contents in the X direction on the left sub-window 1207 as the first side of the boundary 1205 to be equal to the moving amount ΔPx of the cursor P in the X direction. Also, the CPU 101 sets the moving amount ΔQRx of the position QR of the arbitrary display contents in the X direction on the right sub-window 1208 as the second side of the boundary 1205 to be equal to the moving amount ΔPx of the cursor P in the X direction. As a result, the display contents on the sub-windows are scrolled by a size corresponding to the change amount of the boundary 1205 in the X direction.

In step S1411, the CPU 101 sets the moving amount ΔQLx of the position QL of the arbitrary display contents in the X direction on the left sub-window 1207 as the first side of the boundary 1205 to be equal to the moving amount ΔPx of the cursor P in the X direction. Also, the CPU 101 sets the moving amount ΔQRx of the position QR of the arbitrary display contents in the X direction on the right sub-window 1208 as the second side of the boundary 1205 to be zero. In this way, the display contents on the left sub-window 1207 are scrolled by a size corresponding to the change amount of the boundary 1205 in the X direction. On the other hand, the display contents on the right sub-window 1208 are not scrolled.

In step S1412, the CPU 101 sets the moving amount ΔQLx of the position QL of the arbitrary display contents in the X direction on the left sub-window 1207 as the first side of the boundary 1205 to be zero. Also, the CPU 101 sets the moving amount ΔQRx of the position QR of the arbitrary display contents in the X direction on the right sub-window 1208 as the second side of the boundary 1205 to be equal to the moving amount ΔPx of the cursor P in the X direction. In this way, the display contents on the left sub-window 1207 are not scrolled. On the other hand, the display contents on the right sub-window 1208 are scrolled by a size corresponding to the change amount of the boundary 1205 in the X direction.

In step S1413, the CPU 101 sets the moving amount ΔQLx of the position QL of the arbitrary display contents in the X direction on the left sub-window 1207 as the first side of the boundary 1205 to be zero. Also, the CPU 101 sets the moving amount ΔQRx of the position QR of the arbitrary display contents in the X direction on the right sub-window 1208 as the second side of the boundary 1205 to be zero. In this way, the display contents on the sub-windows 1207 and 1208 are not scrolled.

In step S1414, the CPU 101 updates displays of the cursor and window 1200. The CPU 101 executes this updating process based on the position BLx of the boundary 1205 determined in step S1408, and the moving amounts ΔQLx and ΔQRx determined in any of steps S1410 to S1413. After that, the process returns to step S1406 to continue the processing.

Note that a loop from step S1406 to step S1412 represents cursor movement during dragging, that is, that dragging is continued and resizing of the window is in progress during this loop. When the control leaves this loop, this represents that the drop operation is made to settle the window size.

The operation of this embodiment has been described. Note that the same display control method according to this embodiment can be applied to not only the window of the configuration shown in FIGS. 12 and 13 but also to a window divided into upper and lower sub-windows. Furthermore, the method of this embodiment can be applied to a window divided into upper, lower, left and right sub-windows, as shown in FIG. 11.

The window shown in FIG. 11 is normally configured, so that a boundary which divides the upper and lower sub-windows and that which divides the right and left sub-windows are independently operable. Hence, by executing the same processing as that shown in FIG. 14 in turn to these boundaries, the display control method of this embodiment can be applied.

Figure 15A:
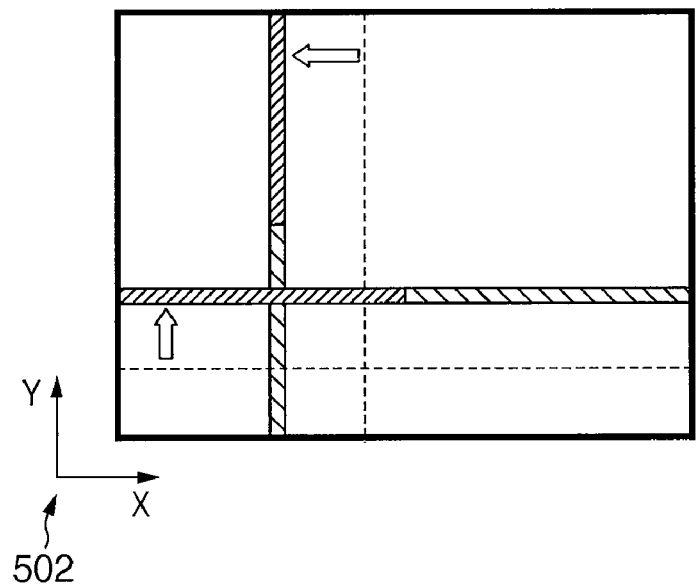
FIGS. 15A and 15B show division examples of boundaries.
Figure 15B:
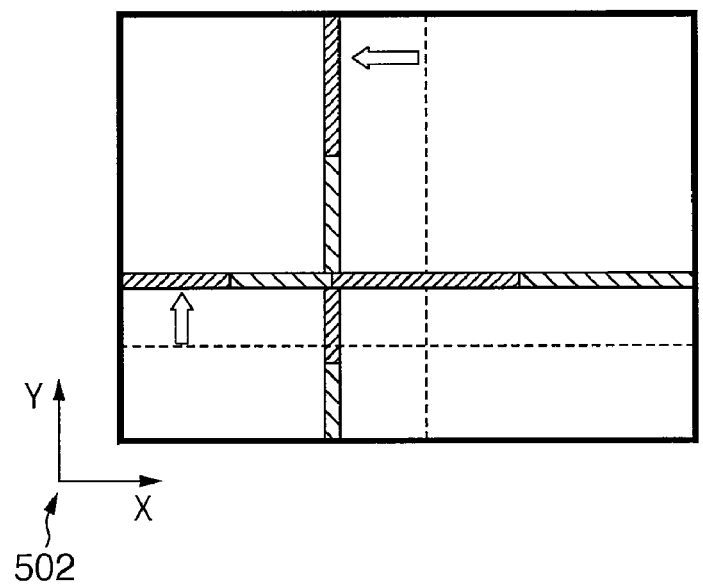

In this case, the first and second regions are required to be defined on each boundary. As shown in FIG. 15A, the length of each boundary may be equally divided. Alternatively, as shown in FIG. 15B, a part divided by an intersection of the vertical and horizontal boundaries may be equally divided. In case of FIG. 15B, the lengths of the first and second regions change sequentially depending on the position of the intersection.

As described above, according to this embodiment, when a windows is divided into sub-windows by a boundary, the change method of the display contents in the sub-windows can be controlled simultaneously with resizing of the sub-windows. In this way, a desired display result can be obtained by a series of operations, thus improving the work efficiency.

Fifth Embodiment

This embodiment proposes display control which is executed in association with the scrolling ON/OFF control method upon resizing a window, that is proposed by the present invention.

Conventionally, display control executed upon resizing includes control for switching ON/OFF of scrolling or a scroll ratio of the display contents according to dragging of a border or corner, control for reducing or enlarging the display contents according to dragging of a border or corner, or the like.

In general, when the display contents are scrolled upon resizing, the contents on an area opposite to the dragged part are hidden. On the other hand, when the display contents are not scrolled upon resizing, the contents of an area near the dragged part are hidden. (Note that the "area opposite to the dragged part" is an area near a border opposite to the dragged border, or an area near two borders that do not contact the dragged corner. The "area near the dragged part" is an area near the dragged border or an area near two borders that contact the dragged corner.)

When a part of the window is hidden, the usability may often be impaired. Hence, it is desired to display such part although imperfectly. Hence, in this embodiment, object images such as characters, patterns, photos, and the like, which are located on an area to be normally hidden, are displayed while being jammed into the area to be hidden, so as to allow the user to see them.

Figure 16:
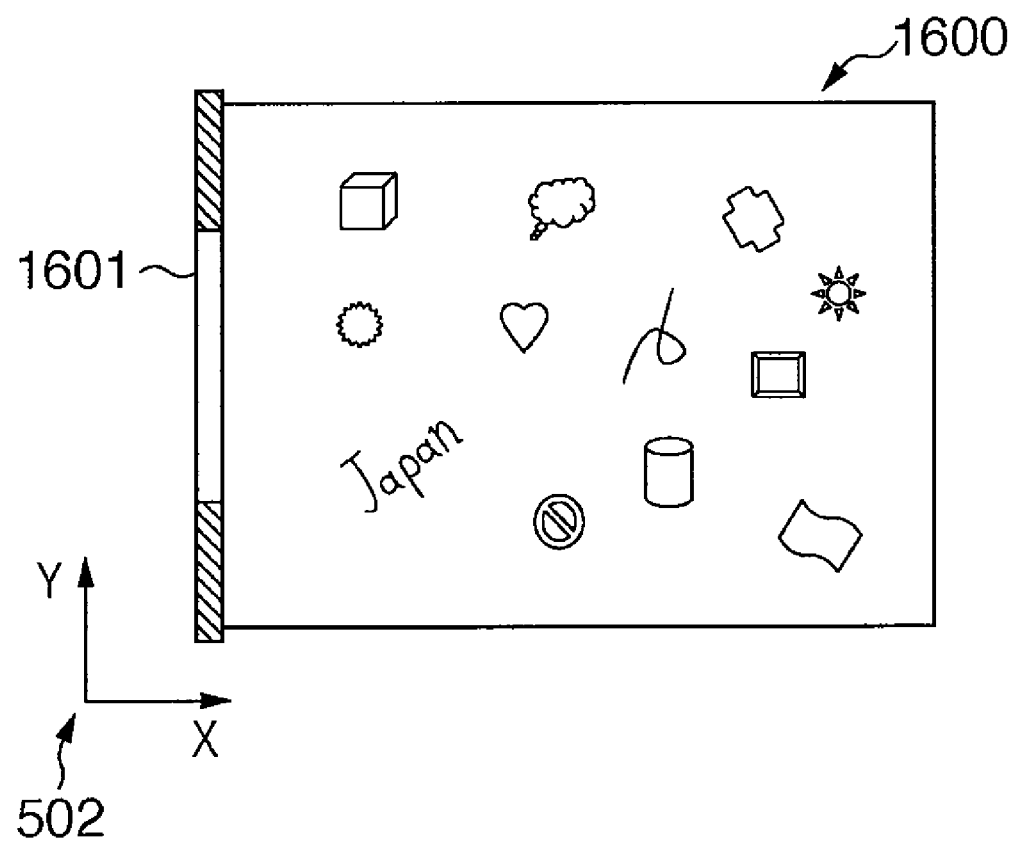
FIG. 16 shows an example of display contents of a window according to the fifth embodiment of the invention.

For example, display contents shown in FIG. 16 are assumed. This may be a normal window described in the first embodiment or may be a window which is described in the second embodiment, and is always maximized in one direction (Y direction) within the display screen. In FIG. 16, a left border 1601 is movable by dragging, and a window 1600 can be resized by moving this border 1601.

Figure 17A:
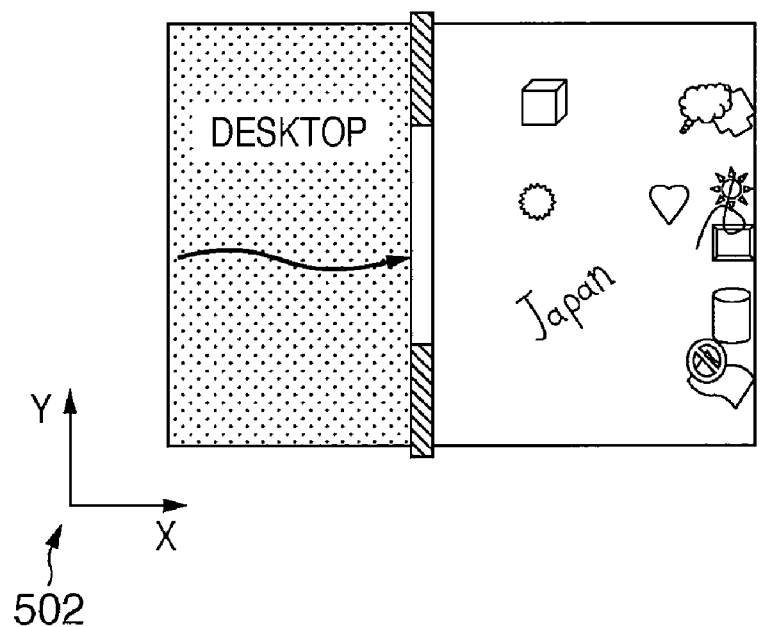
FIGS. 17A and 17B show display examples when the user resizes (reduces) the window by dragging one border of the window according to the fifth embodiment of the invention.
Figure 17B:
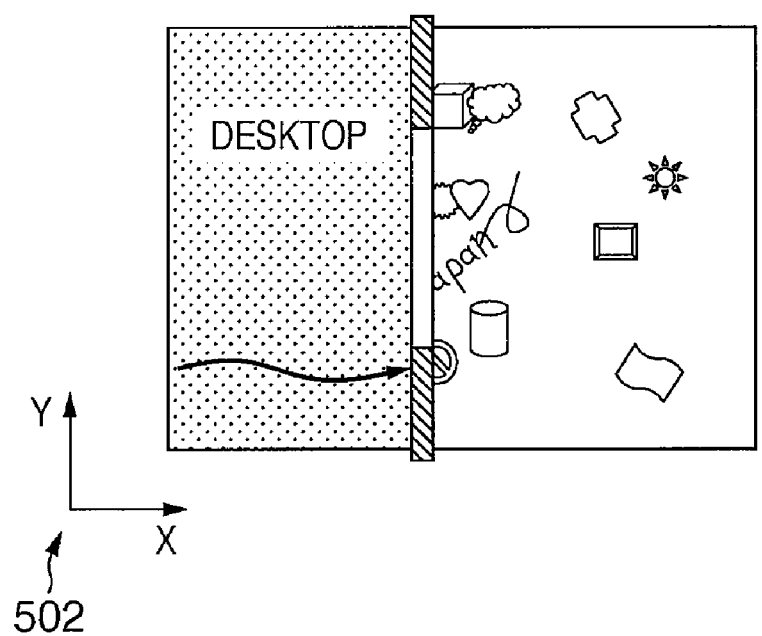

FIGS. 17A and 17B show display examples when the user resizes (reduces) the window by dragging the border in this embodiment. FIG. 17A shows a display example upon resizing with scrolling. With this display control, respective objects move to the right upon resizing, and their movement stops when these objects are brought into contact with the opposing border. In this case, the objects are displayed to overlap each other near the opposing border.

FIG. 17B shows a display example upon resizing without scrolling. With this display control, since scrolling is not made, all objects are displayed without moving their position at the beginning of dragging of the border. However, when the dragged border moves to the right and is brought into contact with respective objects, these objects begin to move to the right. In this case, the objects are displayed to overlap each other near the dragged border. As the overlapping order, a newly stopped object may be displayed in front of or behind a preexistent object.

According to such display control, display control as if objects attached to a window were being scooped by a wiper can be implemented, and objects which are normally hidden are displayed although imperfectly, thus improving the usability.

Figure 18A:
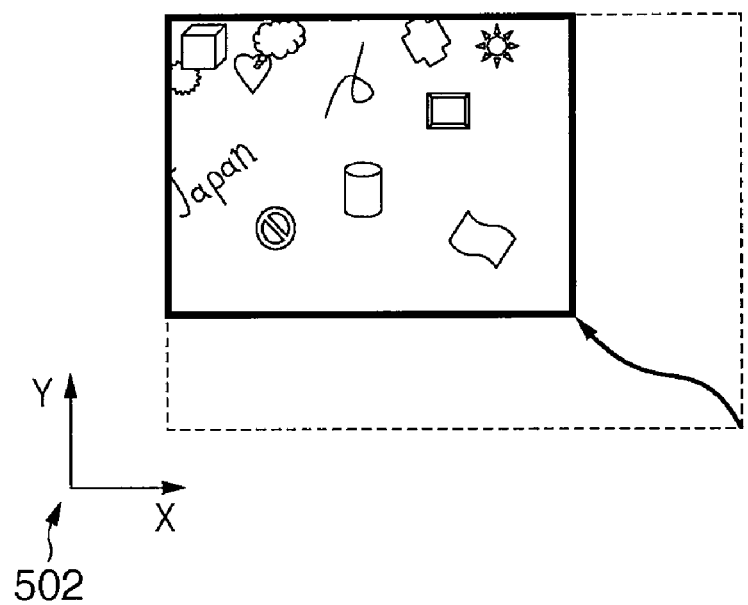
FIGS. 18A and 18B show display examples when the user resizes the window by dragging one corner of the window according to the fifth embodiment of the invention.
Figure 18B:
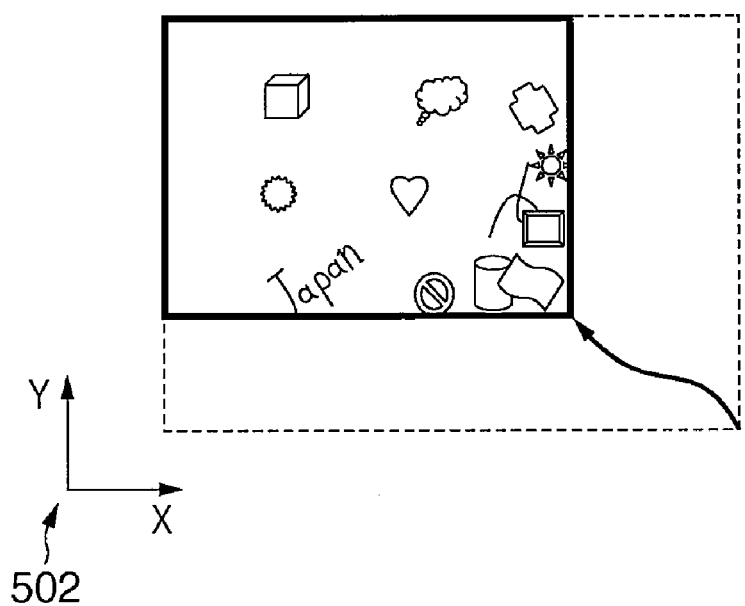

FIGS. 18A and 18B show display examples upon resizing a window by dragging one corner of the window.

FIG. 18A shows a display example upon resizing with scrolling, and FIG. 18B shows that upon resizing without scrolling. The respective operations have the same contents described using FIGS. 17A and 17B for X and Y components.

Figure 19A:
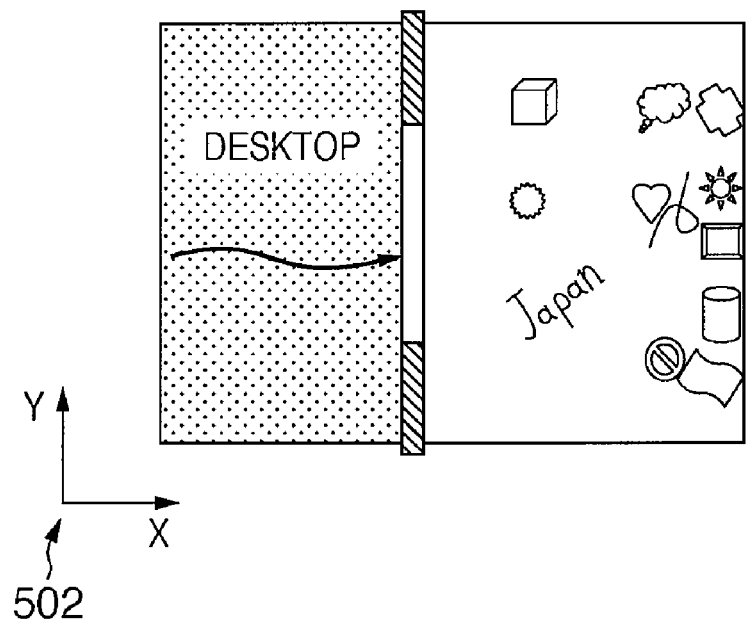
FIGS. 19A and 19B show display examples that allow a normally hidden part to be easier to see according to the fifth embodiment of the invention.
Figure 19B:
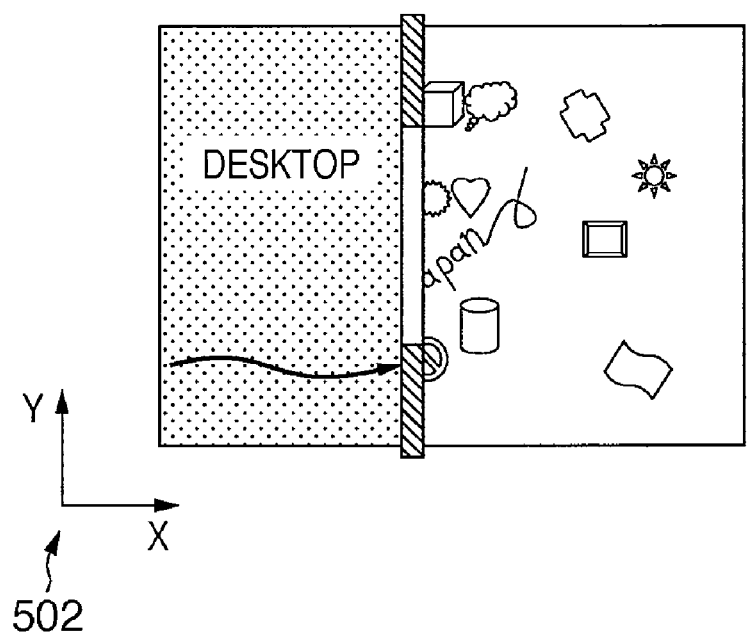

In order to allow the user to recognize an object group to be normally hidden more easily, a method shown in FIGS. 19A and 19B is also available. FIG. 19A shows a display example upon resizing with scrolling. In this case, the following display control is executed. That is, respective objects move to the right upon resizing, and their movement stops when respective objects are brought into contact with the opposing border. In addition, when such object is brought into contact with another object whose movement has already stopped previously, the movement of that object stops at that time. As a result, objects are displayed not to overlap each other unlike in FIG. 17B.

FIG. 19B shows a case upon resizing without scrolling. The following display control is executed. That is, all objects stand still initially. When the dragged border moves to the right and is brought into contact with respective objects, these objects begin to move to the right. In addition, when the objects which have already begun to move are brought into contact with other objects, the other objects begin to move at that time. As a result, objects are displayed not to overlap each other unlike in FIG. 17B.

Note that upon resizing using the corner, the operations have the same contents for X and Y components.

Figure 20:
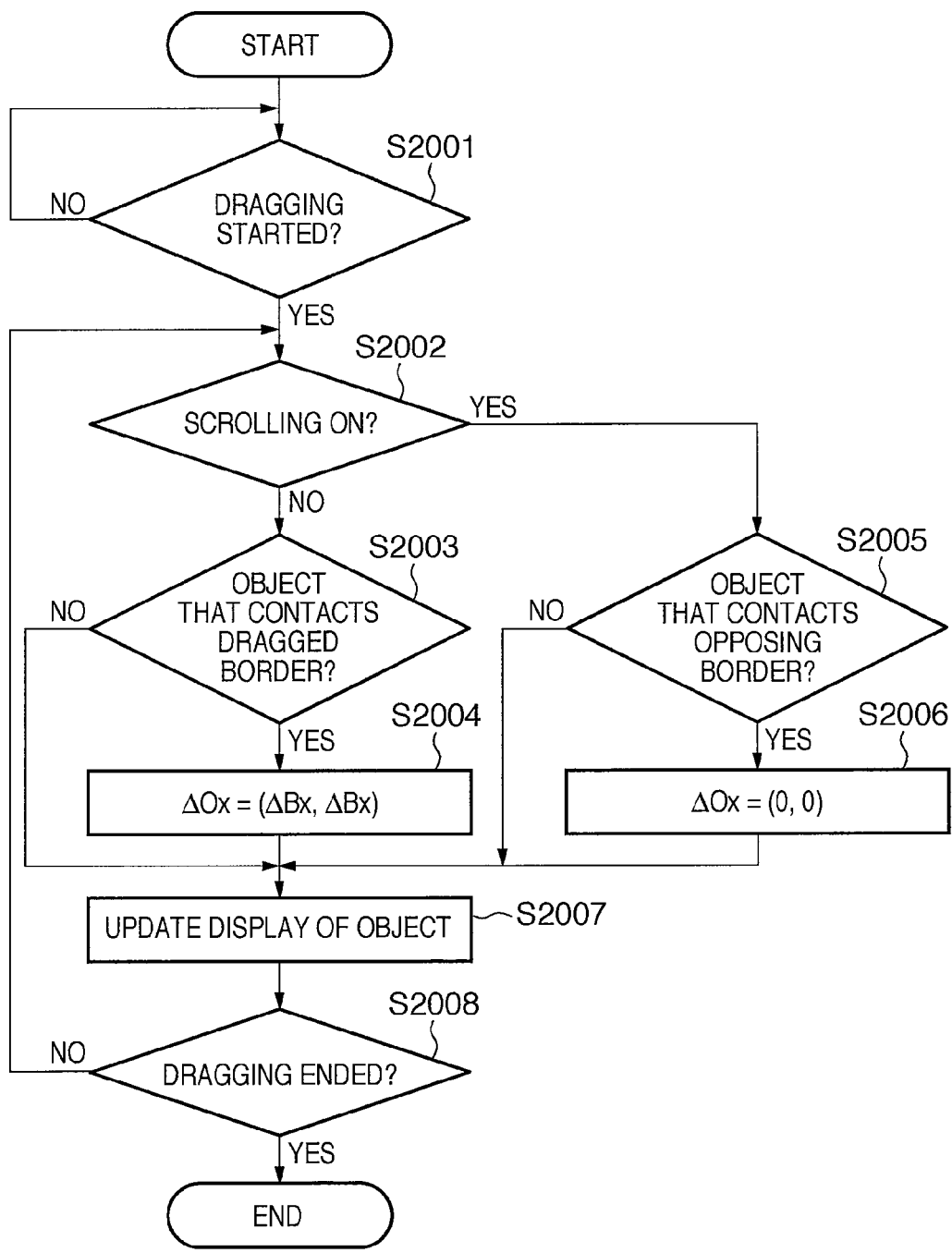
FIG. 20 is a flowchart showing an example of window resizing processing corresponding to the display examples shown in FIGS. 17A and 17B.
Figure 21:
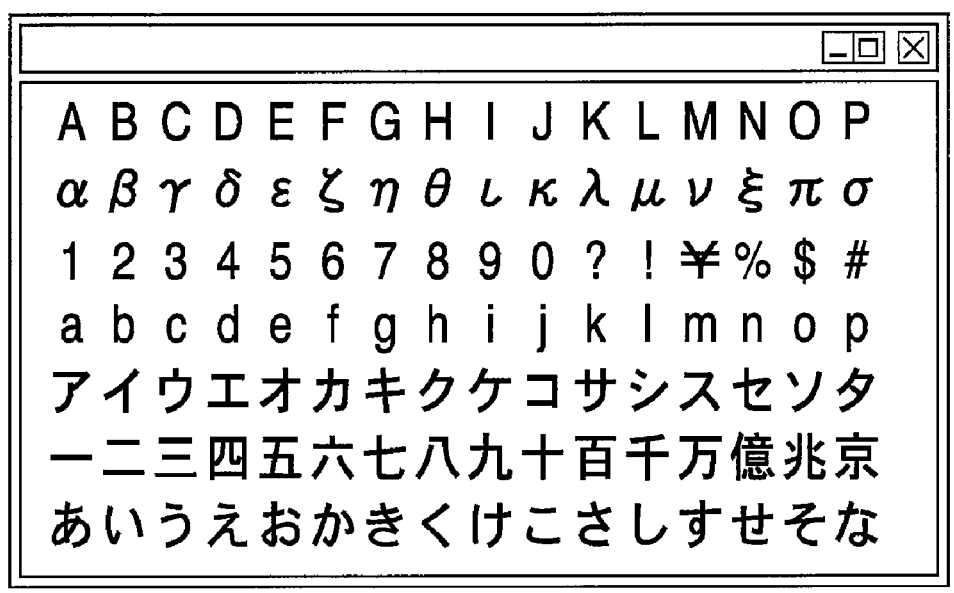
FIG. 21 shows the configuration of a window displayed on a display device.
Figure 22A:
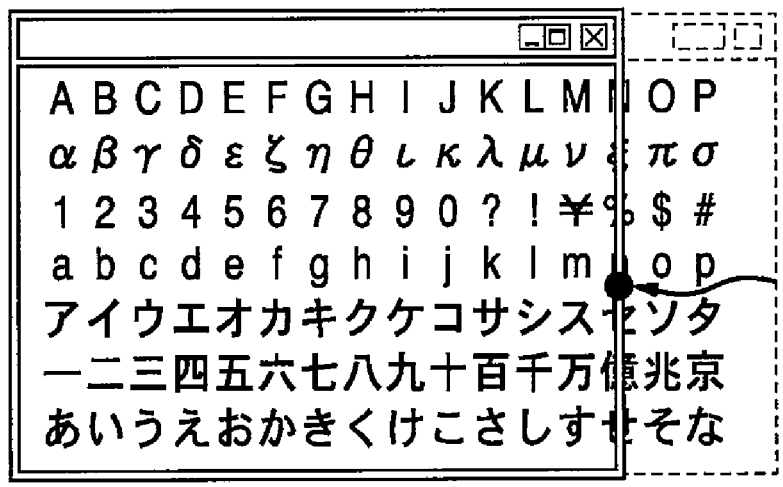
FIGS. 22A to 22D show cases in which the user resizes the window shown in FIG. 21 by dragging one of four borders.
Figure 22B:
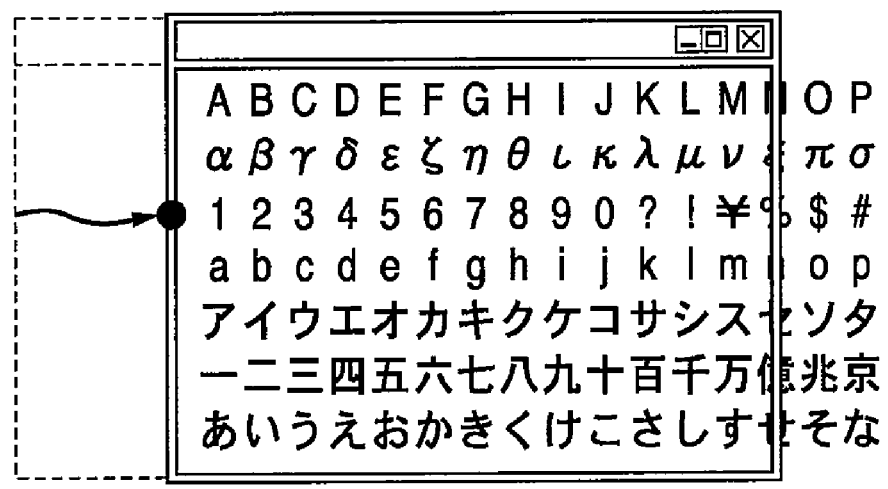
Figure 22C:
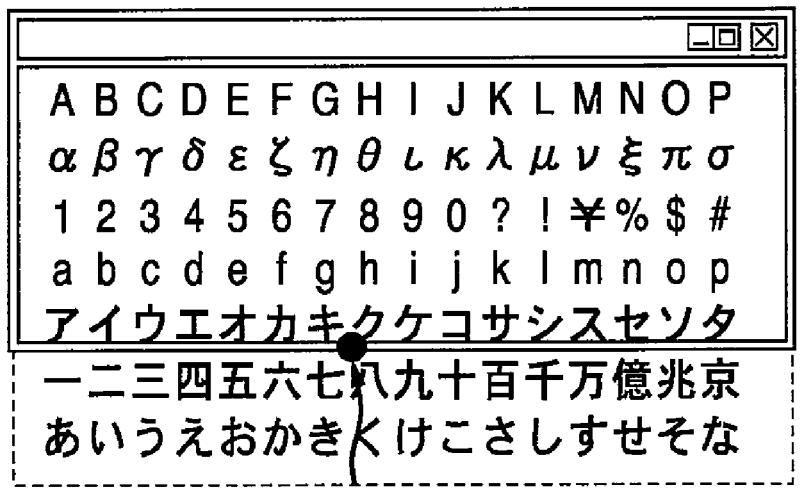
Figure 22D:
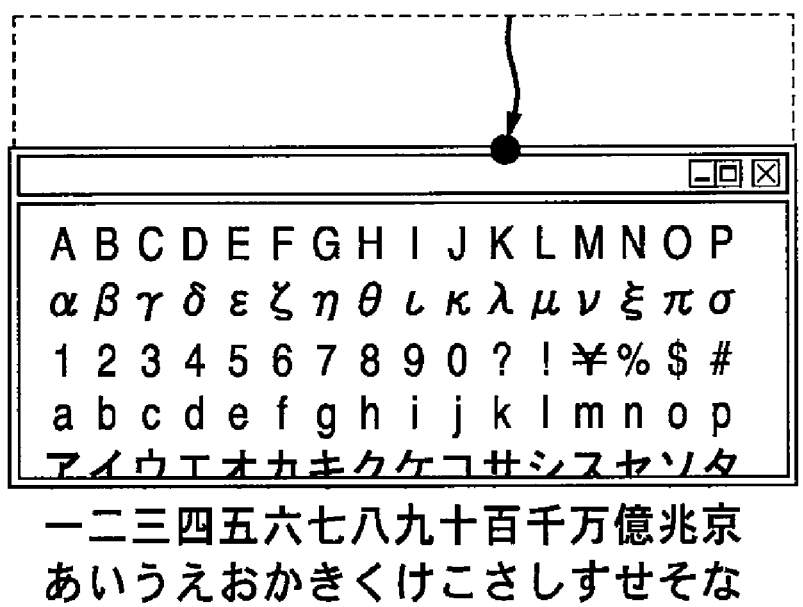
Figure 23A:
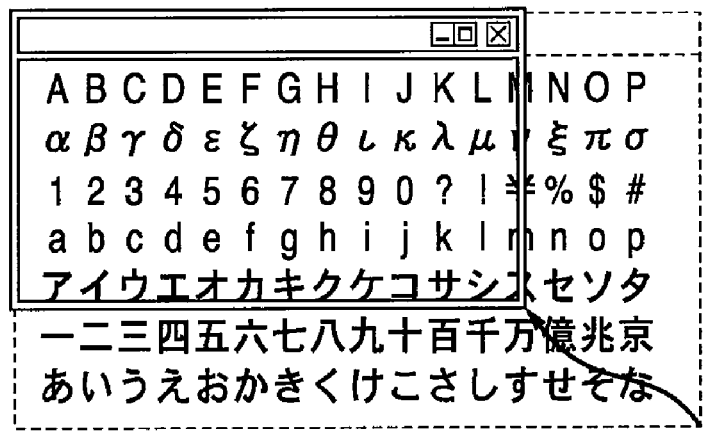
FIGS. 23A to 23D show cases in which the user resizes the window shown in FIG. 21 by dragging one of four corners of the window.
Figure 23B:
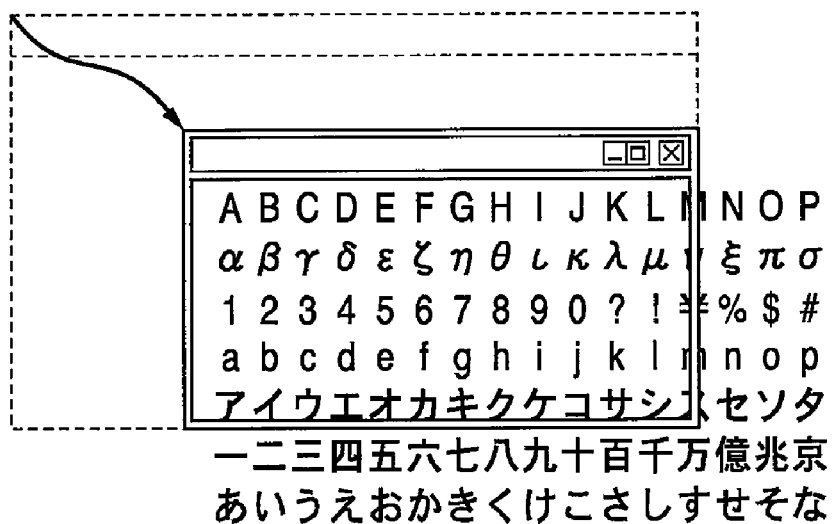
Figure 23C:
Figure 23D:
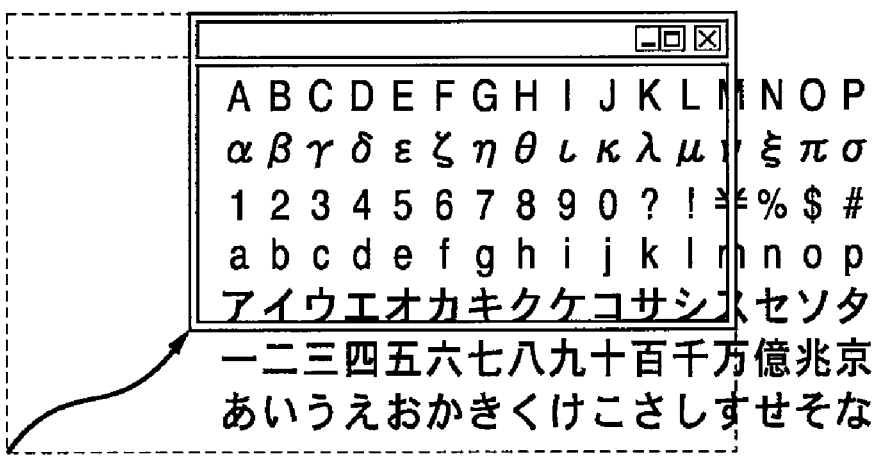

The display control processing according to this embodiment will be described below with reference to the flowchart shown in FIG. 20. FIG. 20 is a flowchart showing an example of the window resizing processing corresponding to the display examples shown in FIGS. 17A and 17B. The processing corresponding to the flowchart shown in FIG. 20 is implemented when a CPU 101 reads out a corresponding processing program stored in an HD 103 onto a RAM 102 and executes that program to control respective components.

The CPU 101 determines in step S2001 whether or not the user begins to drag a border. If the user begins to drag the border ("YES" in step S2001), the process advances to step S2002. The CPU 101 determines in step S2002 if scrolling is ON simultaneously with resizing of a window by dragging. If it is determined that scrolling is OFF ("NO" in step S2002), the process advances to step S2003; otherwise ("YES" in step S2002), the process advances to step S2005. Note that ON/OFF of scrolling can be determined according to the processes described in the first to fourth embodiments.

A case will be examined below wherein a display area of an object O is expressed by $O\{(O1x, O1y), (O2x, O2y)\}$. Note that $(O1x, O1y)$ represents the coordinates of the upper left end of the object, and $(O2x, O2y)$ represents the coordinates of the lower right end of the object. Note that the left direction corresponds to a negative direction of the X-axis on an X-Y coordinate system 502 set in association with the display screen, and the up direction corresponds to a positive direction of the Y-axis. Likewise, the right direction corresponds to a positive direction of the X-axis, and the down direction corresponds to a negative direction of the Y-axis. Let $\Delta O(\Delta O1x, \Delta O2x)$ be a change in display area O in the X-axis direction.

If it is determined in step S2002 that scrolling is OFF, the display position of the object O is basically not changed. That is, the change amount $\Delta O=(0, 0)$ of the coordinates of the display area. On the other hand, if it is determined in step S2002 that scrolling is ON, the display position of the object O is changed according to the drag amount. For example, letting Bx be the coordinate of the dragged border in the X direction, and $\Delta Bx$ be the moving amount, the change amount $\Delta Ox=(\Delta Bx, \Delta Bx)$ of the display area of the object in the X direction. Note that display of such standard objects is not the gist of this embodiment, and is not described in the flowchart of FIG. 20. However, in practice, this display control is applied to objects which do not contact the dragged border or opposing border.

The following explanation will continue while focusing on an object which is in contact with the dragged border or its opposing border.

The CPU 101 determines in step S2003 whether or not there is an object which is in contact with the dragged border. This determination process can be attained by comparing the coordinates of the display position of the object, and those of the dragged border. At this time, when the X-coordinate Bx of the dragged border falls within a range $O1x \leq Bx \leq O2x$, it can be considered that the object is in contact with the dragged border. Note that since the flowchart of FIG. 20 assumes the case of FIGS. 17A and 17B, that is, the case of dragging the border in the X direction, only the coordinate in the X-axis direction is considered. In addition, when a border also moves in the Y direction, whether or not an object is in contact with the dragged border can be determined by seeing whether or not the position By of the border in the Y direction falls within the range of that object.

If it is determined that there is an object that is in contact with the dragged border ("YES" in step S2003), the process advances to step S2004. On the other hand, if it is determined that there is no object that is in contact with the dragged border ("NO" in step S2003), the process jumps to step S2007.

In step S2004, the CPU 101 changes the display position of the object which is determined to contact the border according to the moving amount $\Delta Bx$ of the border. That is, the CPU 101 sets the moving amount $\Delta Ox=(0, 0)$ of the object before contact to be equal to $\Delta Ox=(\Delta Bx, \Delta Bx)$, so as to be matched with the moving amount of the dragged border. As a result, if scrolling is OFF, the display position of the object which is in contact with the dragged border can be moved and displayed together with the dragged border. After that, the process advances to step S2007.

If scrolling is executed simultaneously with dragging of the border, the CPU 101 determines in step S2005 whether or not there is an object that is in contact with the border opposite to the dragged border.

In this case as well, letting BOx be the X-coordinate of the opposing border, if BOx falls within a range $O1x \leq BOx \leq O2x$, it can be considered that the object is in contact with the opposing border. Note that since the flowchart of FIG. 20 assumes the case of FIGS. 17A and 17B, that is, the case of dragging the border in the X direction, only the coordinate in the X-axis direction is considered. In addition, when a border also moves in the Y direction, whether or not an object is in contact with the opposing border can be determined by seeing whether or not the position BOy of the opposing border in the Y direction falls within the range of that object.

If it is determined that there is an object that contacts the opposing border ("YES" in step S2005), the process advances to step S2006. On the other hand, if it is determined that there is no object that contacts the opposing border ("NO" in step S2005), the process jumps to step S2007.

In step S2006, the CPU 101 fixes the display position of the object which is determined to contact at the current display position. That is, the object is scrolled before contact to have $\Delta Ox=(\Delta Bx, \Delta Bx)$ in accordance with the change amount by dragging, and its scrolling is stopped to have $\Delta Ox=(0, 0)$. In this way, even when scrolling is executed as a whole, the display position of the object which is in contact with the opposing border is fixed near the opposing border, so that the object stays within the window display area. After that, the process advances to step S2007.

In step S2007, the CPU 101 updates display of the object which is in contact with the border based on the moving amount of the object determined in step S2004 or S2006. The CPU 101 updates display of other objects according to ON/OFF of scrolling based on the determination result in step S2002.

The CPU 101 determines in step S2008 whether or not the user ends dragging. If it is determined that the user ends dragging ("YES" in step S2008), this processing ends. On the other hand, if it is determined that the user does not end dragging ("NO" in step S2008), the process returns to step S2002 to continue the processing.

The processing has been described taking as an example the case of FIGS. 17A and 17B. By extending the aforementioned processing also in the Y direction, the display control corresponding to FIGS. 18A and 18B can be implemented. As for display associated with FIGS. 19A and 19B, whether or not objects are in contact with each other needs to be further determined. Then, in case of "with scrolling", upon detection of a contact with the border or object, a change in display position of that object is stopped (i.e., $\Delta Ox=(0, 0)$). On the other hand, in case of "without scrolling", upon detection of a contact with the border or object, a change in display position of that object is started (i.e., $\Delta Ox=(\Delta Bx, \Delta Bx)$).

Furthermore, even when a window is divided into sub-windows by a boundary like in the fourth embodiment, the display control of objects within a display area can be implemented based on the presence/absence of a contact with the boundary or border in the same manner as described above.

As described above, even when the display contents are scrolled simultaneously with dragging, when an object in the display contents is in contact with an element (border or boundary) of the window, scrolling of the contact object can be suppressed. Even when the display contents are not scrolled simultaneously with dragging, when an object in the display contents is in contact with an element (border or boundary) of the window, the contact object can be scrolled.

On the other hand, even when the display contents are scrolled simultaneously with dragging, when an object in the display contents is in contact with another object whose scrolling has already been suppressed, scrolling of the contact object can also be suppressed. Even when the display contents are not scrolled simultaneously with dragging, when an object in the display contents is in contact with another object which has already been scrolled, the contact object can also be scrolled.

In this way, display control as if objects attached to a window were being scooped by a wiper can be implemented, and objects which are normally hidden are displayed although imperfectly, thus further improving the usability.

Other Embodiments

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments.

Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-186326, filed Jul. 17, 2007, which is hereby incorporated by reference herein in its entirety.

What is claimed is:

1. An information processing apparatus comprising:
a display unit configured to display a window;
an accepting unit configured to accept a resize instruction of the displayed window together with a scroll instruction indicating whether or not to scroll display contents within the window; and
a control unit configured to control a size of the window and a scrolling of the display contents within the window based on contents of the resize instruction and the scroll instruction,
wherein when the scroll instruction indicates that the display contents are to be scrolled, said control unit changes the window to a size indicated by the resize instruction, and scrolls the display contents according to a change amount of the window, and
when the scroll instruction indicates that the display contents are not to be scrolled, said control unit changes the window to a size indicated by the resize instruction, and suppresses a scrolling of the display contents; and
wherein the window is configured to include a border having a first region and a second region, and
when said accepting unit accepts the resize instruction using the first region of the border, said accepting unit accepts the scroll instruction indicating that the display contents are to be scrolled, and
when said accepting unit accepts the resize instruction using the second region of the border, said accepting unit accepts the scroll instruction indicating that the display contents are not to be scrolled.

2. The apparatus according to claim 1, wherein said accepting unit accepts the resize instruction as an instruction to further resize the window during resizing of that window.

3. The apparatus according to claim 1, wherein when only one border of four borders configuring the window has the first region of the border and the second region of the border,
said accepting unit accepts only a resize instruction of the window in a direction perpendicular to the one border, and
said control unit controls the size of the window based on a display position of the one border on said display unit.

4. The apparatus according to claim 1 further comprising:
a first operation unit configured to accept a first instruction operation from a user; and
a second operation unit configured to accept a second instruction operation from the user,
wherein when said second operation unit accepts the second operation instruction after said accepting unit accepts the resize instruction using a part of the window based on the first instruction operation, said accepting unit accepts the scroll instruction indicating that the display contents are to be scrolled, and
when said second operation unit does not accept the second operation instruction after said accepting unit accepts the resize instruction using a part of the window based on the first instruction operation, said accepting unit accepts the scroll instruction indicating that the display contents are not to be scrolled.

5. The apparatus according to claim 4, wherein the part of the window is a border or a corner of the window.

6. The apparatus according to claim 4, wherein said first operation unit is the left button of a mouse connected to said information processing apparatus, and said second operation unit is the right button of the mouse.

7. The apparatus according to claim 4, wherein said first operation unit is a tip switch of a digital pen connected to said information processing apparatus, and said second operation unit is a side switch of the digital pen.

8. The apparatus according to claim 1 further comprising:
a first operation unit configured to accept a first instruction operation from a user; and
a second operation unit configured to accept a second instruction operation from the user,
wherein the window includes a plurality of sub-windows divided by a boundary, and the boundary is configured to have a first region and a second region,
when said second operation unit accepts the second operation instruction after said accepting unit accepts the resize instruction using the first region of the boundary based on the first instruction operation, said accepting unit accepts a scroll instruction indicating that display contents within the sub-window on a first side of the boundary and display contents within the sub-window on a second side of the boundary are to be scrolled,
when said second operation unit does not accept the second operation instruction after said accepting unit accepts the resize instruction using the first region of the boundary based on the first instruction operation, said accepting unit accepts a scroll instruction indicating that display contents within the sub-window on the first side are to be scrolled, and display contents within the sub-window on the second side are not to be scrolled,
when said second operation unit accepts the second operation instruction after said accepting unit accepts the resize instruction using the second region of the boundary based on the first instruction operation, said accepting unit accepts a scroll instruction indicating that display contents within the sub-window on the first side are not to be scrolled, and display contents within the sub-window on the second side are to be scrolled, and when said second operation unit does not accept the second operation instruction after said accepting unit accepts the resize instruction using the second region of the boundary based on the first instruction operation, said accepting unit accepts a scroll instruction indicating that display contents within the sub-window on the first side and display contents within the sub-window on the second side are not to be scrolled.

9. The apparatus according to claim 8, wherein the first side and the second side are the left side and the right side or the upper side and the lower side with respect to the boundary.

10. The apparatus according to claim 1, wherein the display contents include an object,
when the scroll instruction indicates that the display contents are to be scrolled, and when the object is in contact with a border or a boundary of the window, said control unit suppresses the scrolling of the object which is in contact, and
when the scroll instruction indicates that the display contents are not to be scrolled, and when the object is in contact with a border or a boundary of the window, said control unit scrolls the object which is in contact.

11. The apparatus according to claim 10, wherein when the scroll instruction indicates that the display contents are to be scrolled, and when the object is in contact with another scroll-suppressed object, said control unit also suppresses the scrolling of the object which is in contact, and
when the scroll instruction indicates that the display contents are not to be scrolled, and when the object is in contact with another object which has already been scrolled, said control unit also scrolls the object which is in contact.

12. A method of controlling an information processing apparatus comprising:
displaying a window on a display unit;
accepting a resize instruction of the displayed window together with a scroll instruction indicating whether or not to scroll display contents within the window; and
controlling a size of the window and a scrolling of the display contents within the window based on contents of the resize instruction and the scroll instruction,
wherein when the scroll instruction indicates that the display contents are to be scrolled, the window is changed to a size indicated by the resize instruction, and the display contents are scrolled according to a change amount of the window, and
when the scroll instruction indicates that the display contents are not to be scrolled, the window is changed to a size indicated by the resize instruction, and scrolling of the display contents is suppressed; and
wherein the window is configured to include a border having a first region and a second region, and
when said accepting step accepts the resize instruction using the first region of the border, said accepting step accepts the scroll instruction indicating that the display contents are to be scrolled and
when said accepting step accepts the resize instruction using the second region of the border, said accepting unit accepts the scroll instruction indicating that the display contents are not to be scrolled.

13. The method according to claim 12, wherein the resize instruction is accepted as an instruction to further resize the window during resizing of the displayed window.

14. The method according to claim 12, wherein the information processing apparatus further comprises first operation unit configured to accept a first instruction operation from a user, and second operation unit configured to accept a second instruction operation from the user,
the window includes a plurality of sub-windows divided by a boundary, and the boundary is configured to have a first region and a second region,
when the second operation instruction is accepted via the second operation unit after the resize instruction using the first region of the boundary based on the first instruction operation is accepted, a scroll instruction indicating that display contents within the sub-window on a first side of the boundary and display contents within the sub-window on a second side of the boundary are to be scrolled is accepted,
when the second operation instruction is not accepted via the second operation unit after the resize instruction using the first region of the boundary based on the first instruction operation is accepted, a scroll instruction indicating that display contents within the sub-window on the first side are to be scrolled and display contents within the sub-window on the second side are not to be scrolled is accepted,
when the second operation instruction is accepted via the second operation unit after the resize instruction using the second region of the boundary based on the first instruction operation is accepted, a scroll instruction indicating that display contents within the sub-window on the first side are not to be scrolled and display contents within the sub-window on the second side are to be scrolled is accepted, and
when the second operation instruction is not accepted via the second operation unit after the resize instruction using the second region of the boundary based on the first instruction operation is accepted, a scroll instruction indicating that display contents within the sub-window on the first side and display contents within the sub-window on the second side are not to be scrolled is accepted.

15. A computer program stored in a non-transitory computer readable medium for making a computer function as the method of controlling an information processing apparatus according to claim 12.

* * * * *